US011568718B2

(12) United States Patent
Yokoyama et al.

(10) Patent No.: US 11,568,718 B2
(45) Date of Patent: Jan. 31, 2023

(54) INFORMATION PROCESSING APPARATUS, INFORMATION PROCESSING SYSTEM, INFORMATION PROCESSING METHOD, AND PROGRAM

(71) Applicant: SONY GROUP CORPORATION, Tokyo (JP)

(72) Inventors: Ryo Yokoyama, Tokyo (JP); Osamu Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/292,190

(22) PCT Filed: Oct. 28, 2019

(86) PCT No.: PCT/JP2019/042096
§ 371 (c)(1),
(2) Date: May 7, 2021

(87) PCT Pub. No.: WO2020/121662
PCT Pub. Date: Jun. 18, 2020

(65) Prior Publication Data
US 2021/0390835 A1    Dec. 16, 2021

(30) Foreign Application Priority Data

Dec. 13, 2018    (JP) .............................. JP2018-233228

(51) Int. Cl.
*B60Q 1/00*    (2006.01)
*G08B 6/00*    (2006.01)
*H04W 24/08*    (2009.01)

(52) U.S. Cl.
CPC .............. *G08B 6/00* (2013.01); *H04W 24/08* (2013.01)

(58) Field of Classification Search
CPC .......... G08B 6/00; H04W 24/08; G06F 3/016
See application file for complete search history.

(56) References Cited

U.S. PATENT DOCUMENTS 9,437,087 B2 * 9/2016 Phan .................. H04N 21/4516
10,497,277 B2 * 12/2019 Matsunaga ............ A63B 69/38
2007/0236449 A1 10/2007 Lacroix et al.

FOREIGN PATENT DOCUMENTS

| CN | 103649885 A | * | 3/2014 | ............. G06F 3/016 |
| EP | 2806353 A1 | | 11/2014 | |
| JP | 2003-305670 A | | 10/2003 | |
| JP | 2009-217805 A | | 9/2009 | |
| JP | 2009-276970 A | | 11/2009 | |
| JP | 2018-060313 A | | 4/2018 | |

OTHER PUBLICATIONS

Shahabi et al., A Comparison of Different Haptic Compression Techniques, IEEE International Conference on Multimedia and Expo Proceedings, IEEE, Aug. 26-29, 2002, pp. 657-660, Lausanne, CH.

* cited by examiner

*Primary Examiner* — Toan N Pham
(74) *Attorney, Agent, or Firm* — Paratus Law Group, PLLC

(57) ABSTRACT

There is provided an information processing apparatus including a signal processor that extracts at least some frequency components as second control information from a plurality of frequency components included in first control information in accordance with a state of communication, in which a haptic presentation section that presents a haptic stimulus is controlled through the communication on the basis of the second control information.

18 Claims, 16 Drawing Sheets

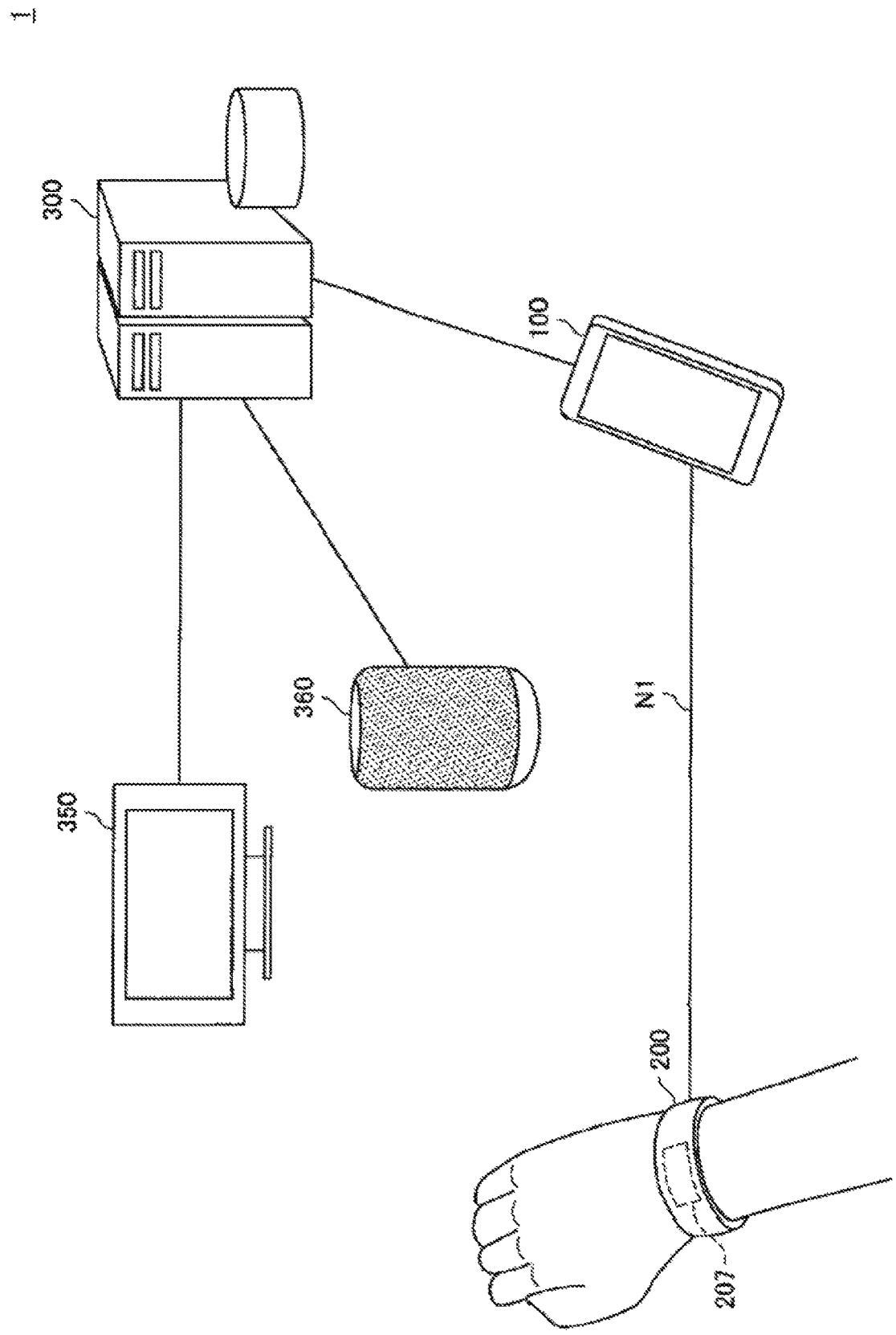
[FIG. 1]

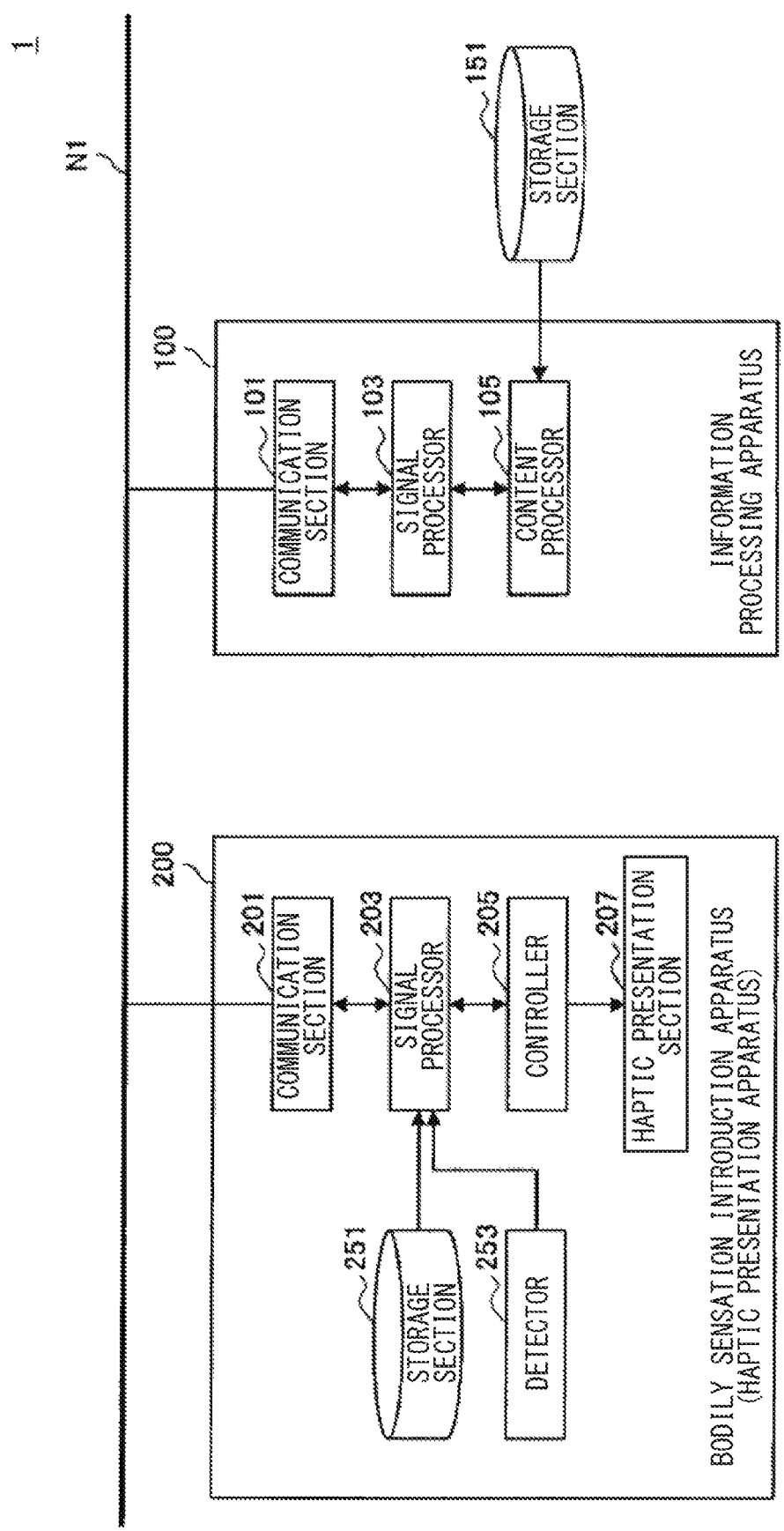
[FIG. 2]

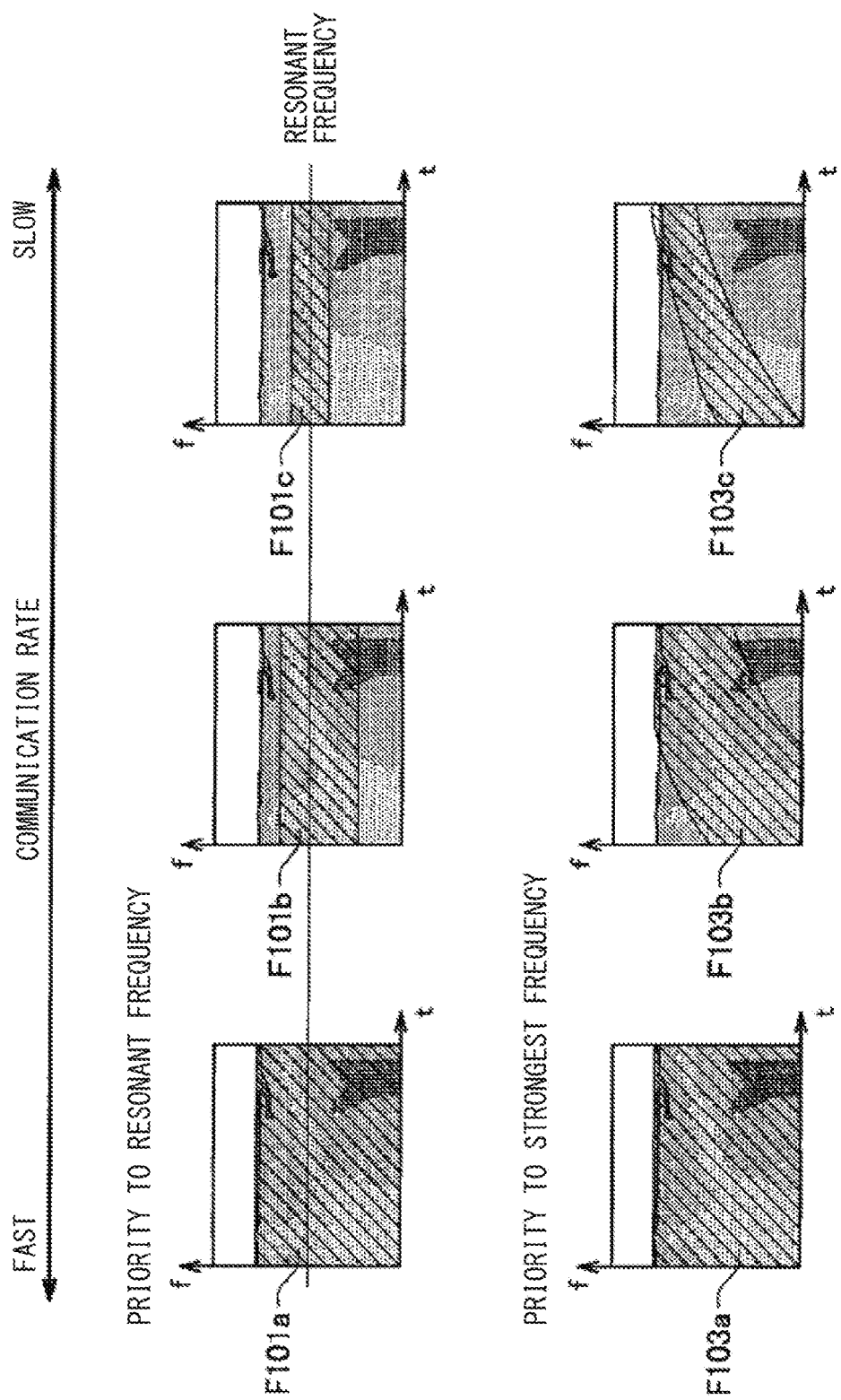

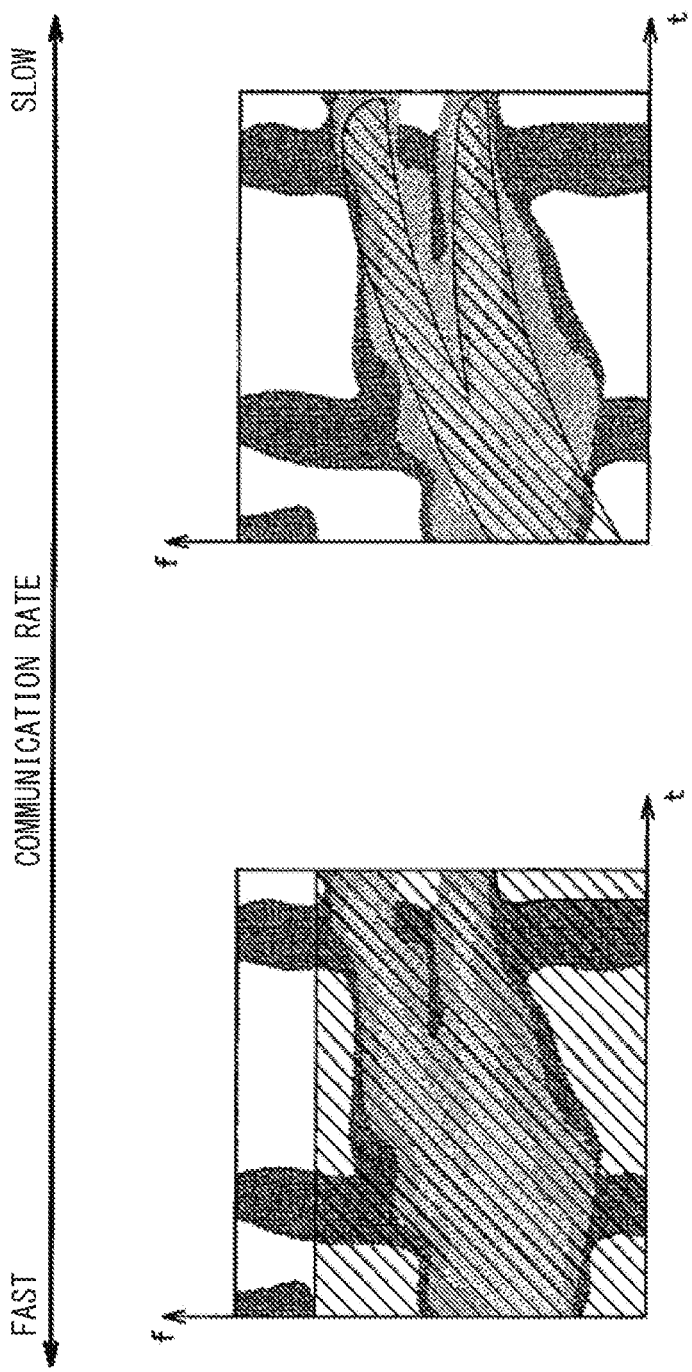
[FIG. 4]

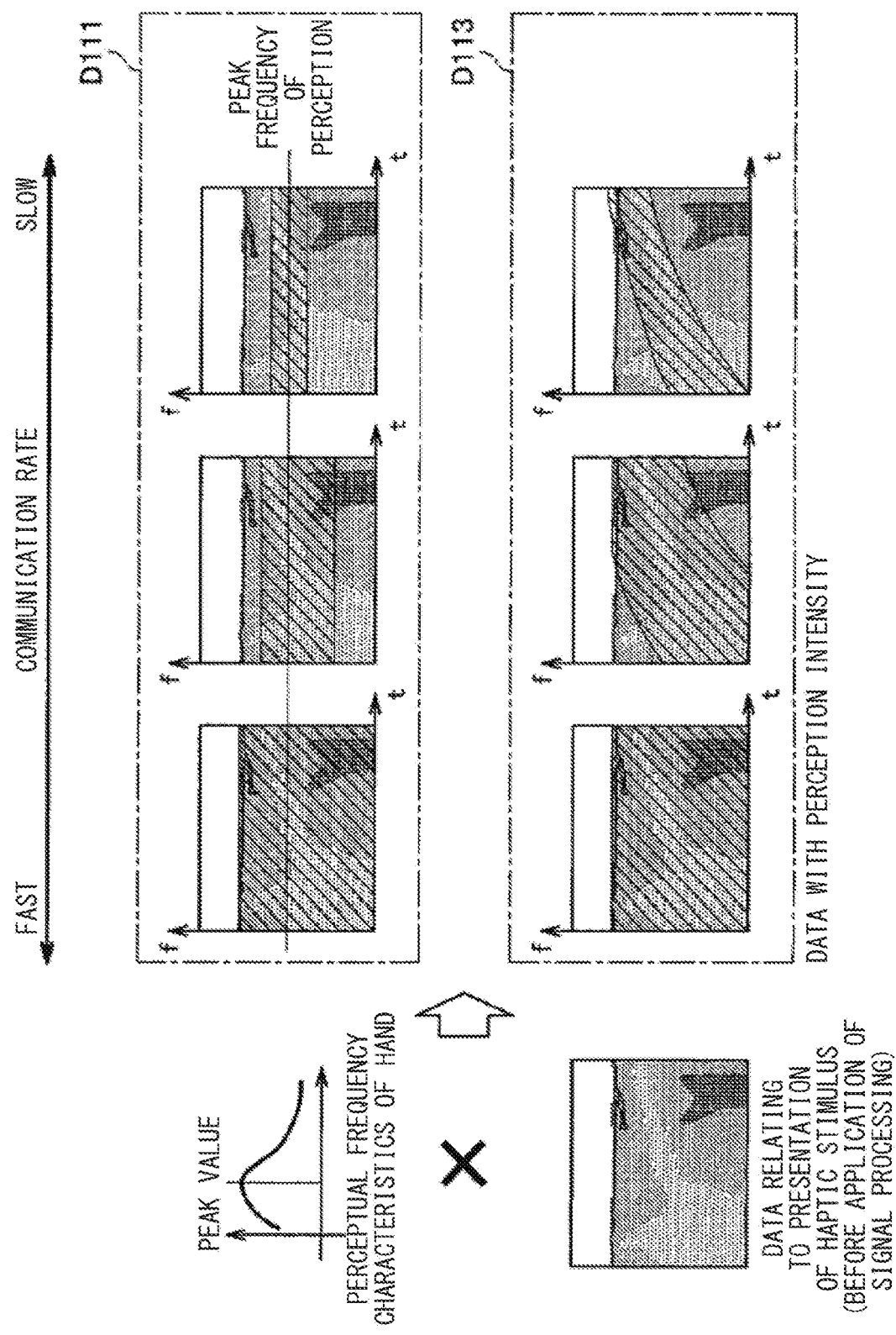

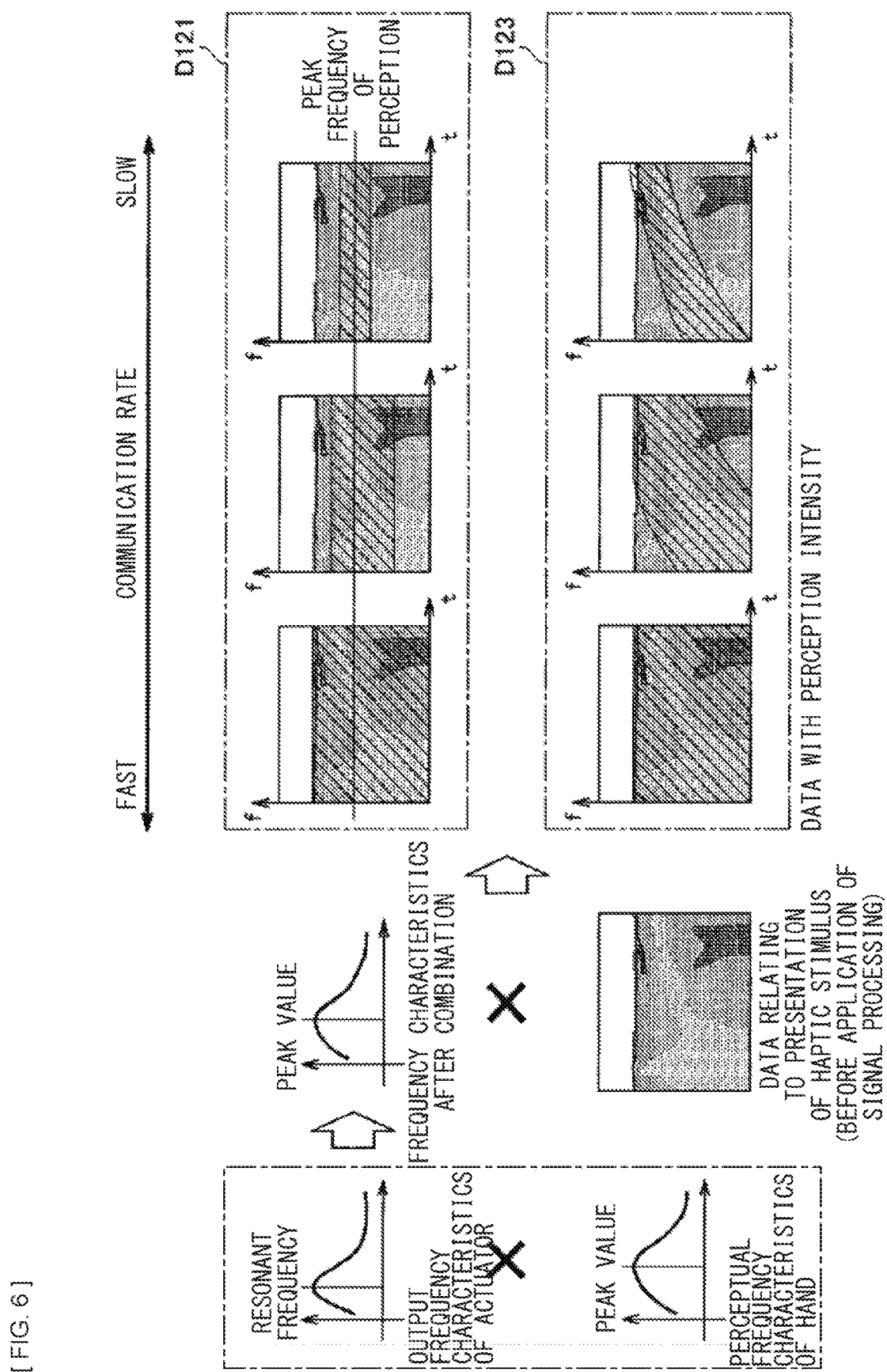
[FIG. 6]

[FIG.7]
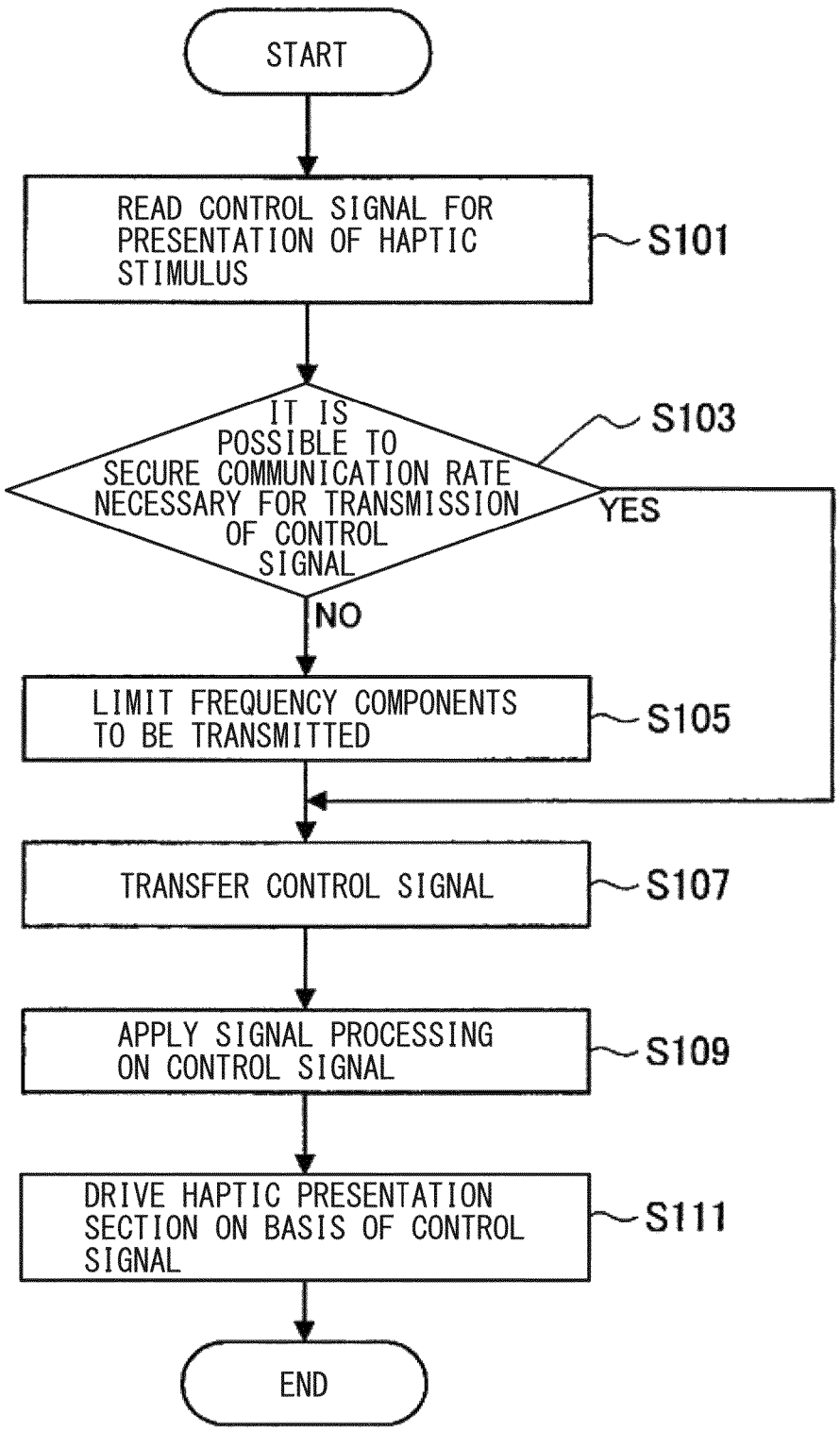

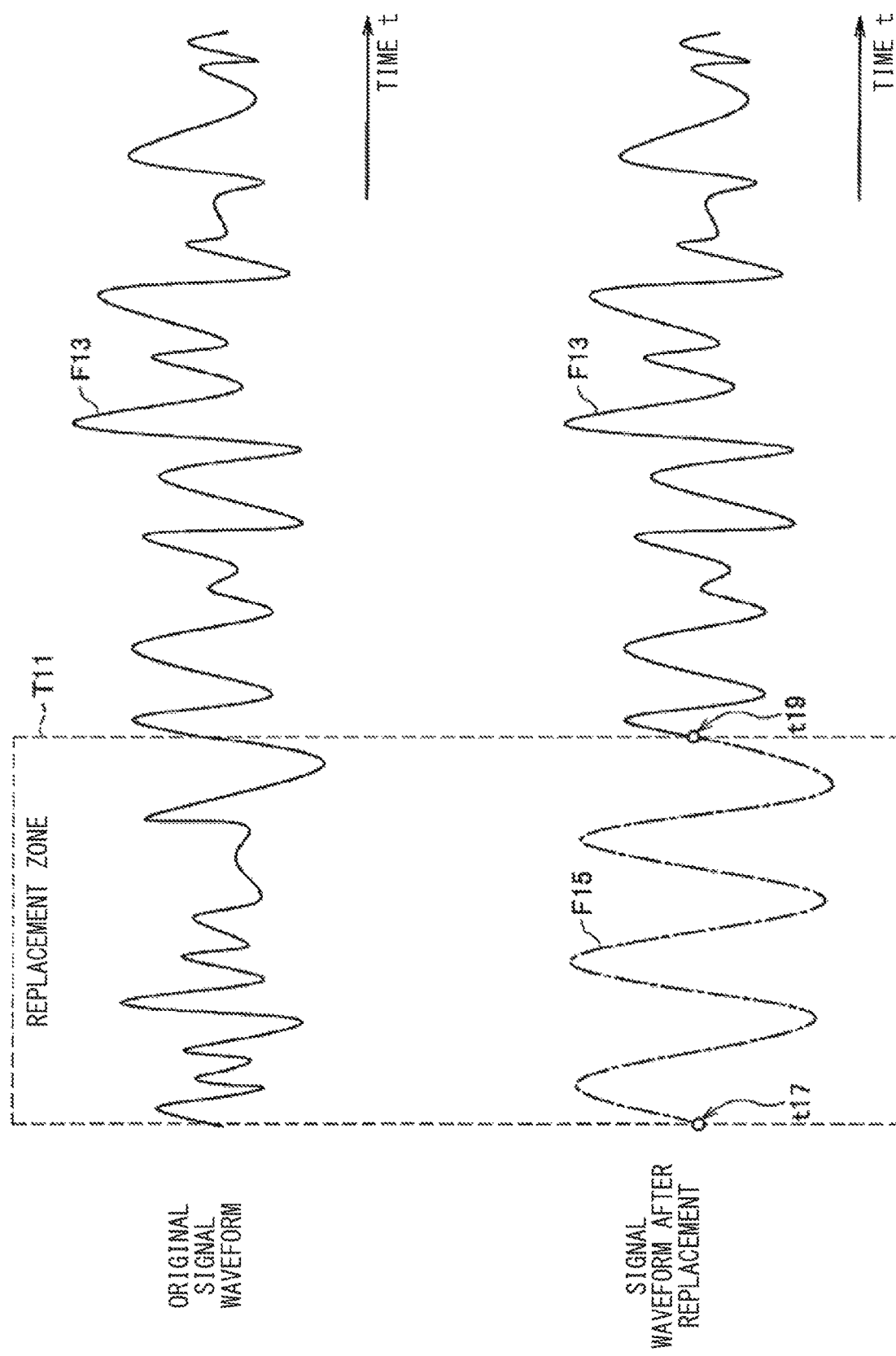

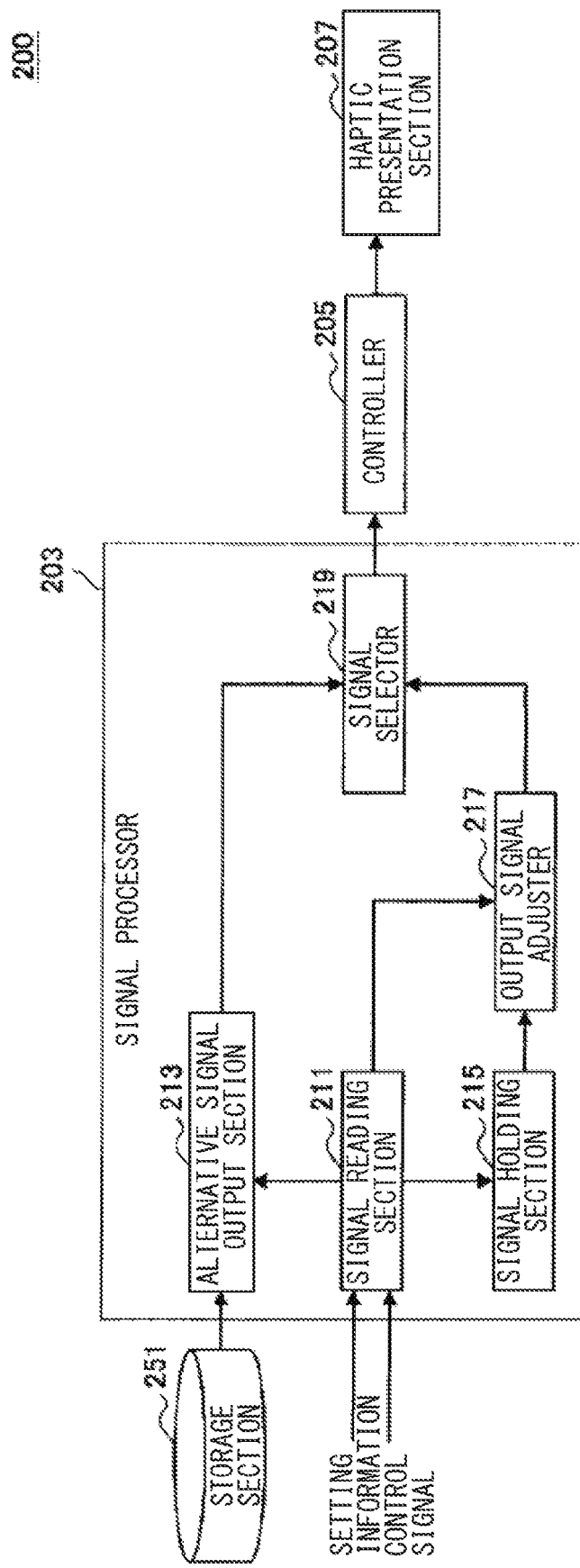
[FIG. 9]

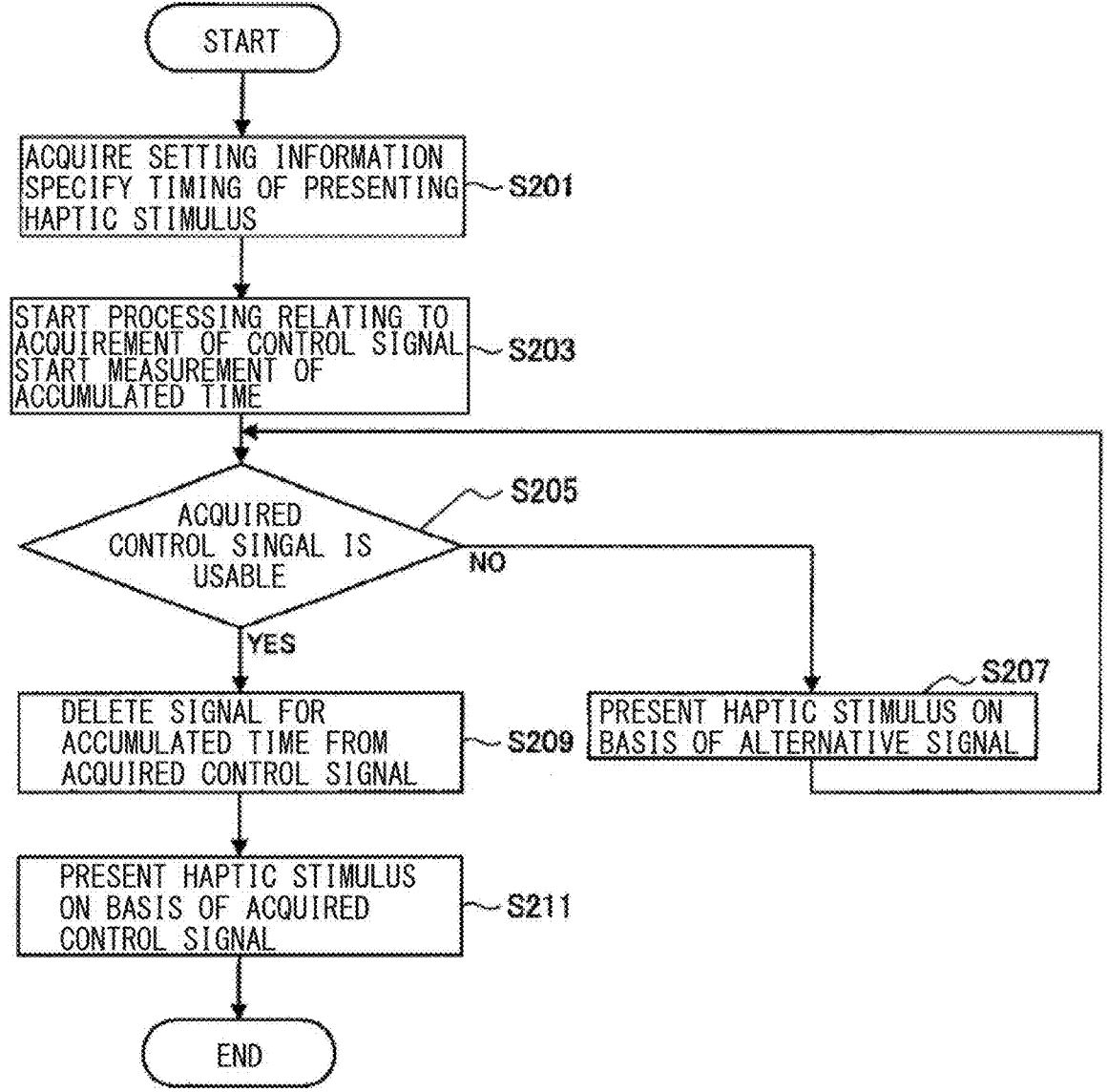

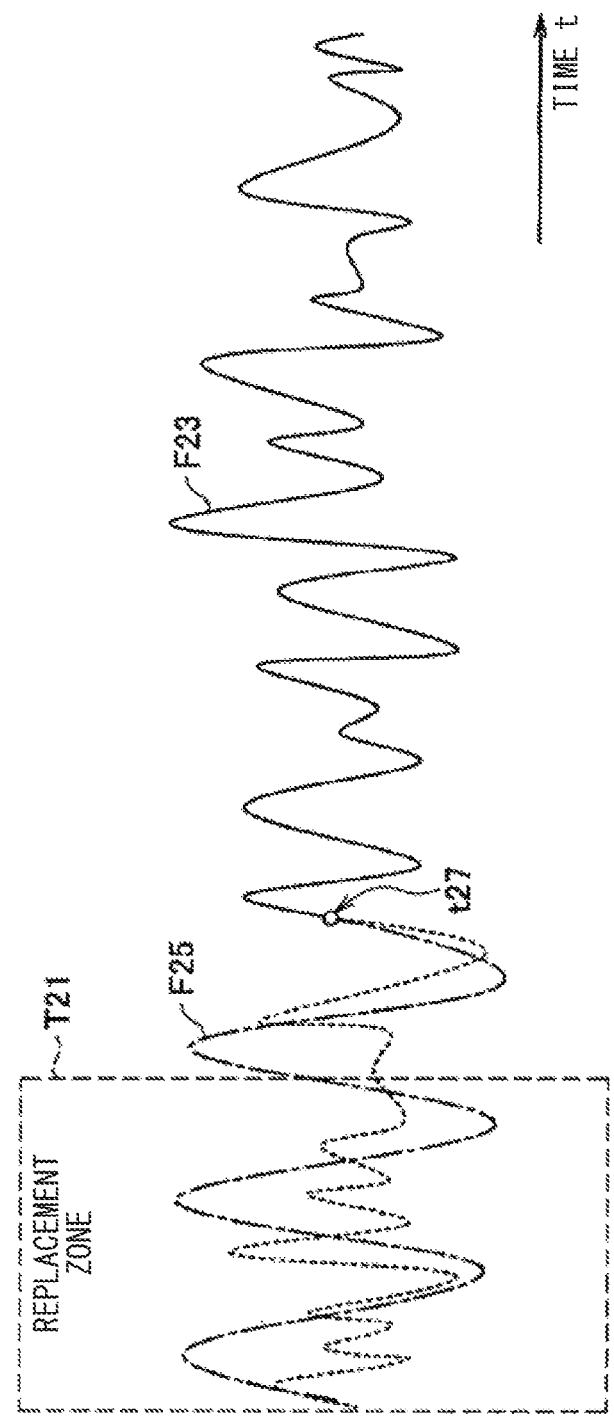
[FIG. 11]

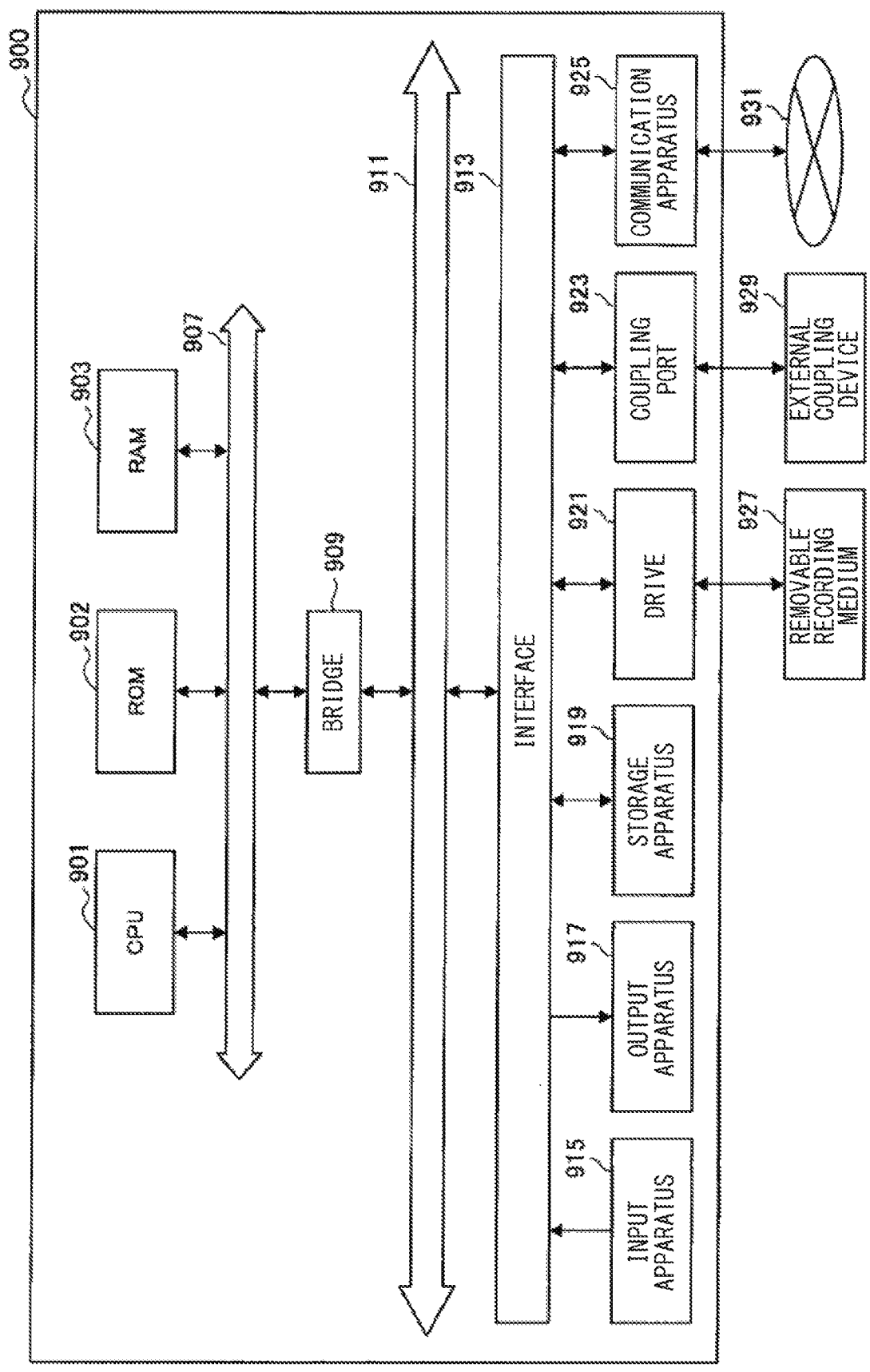

[FIG. 13]
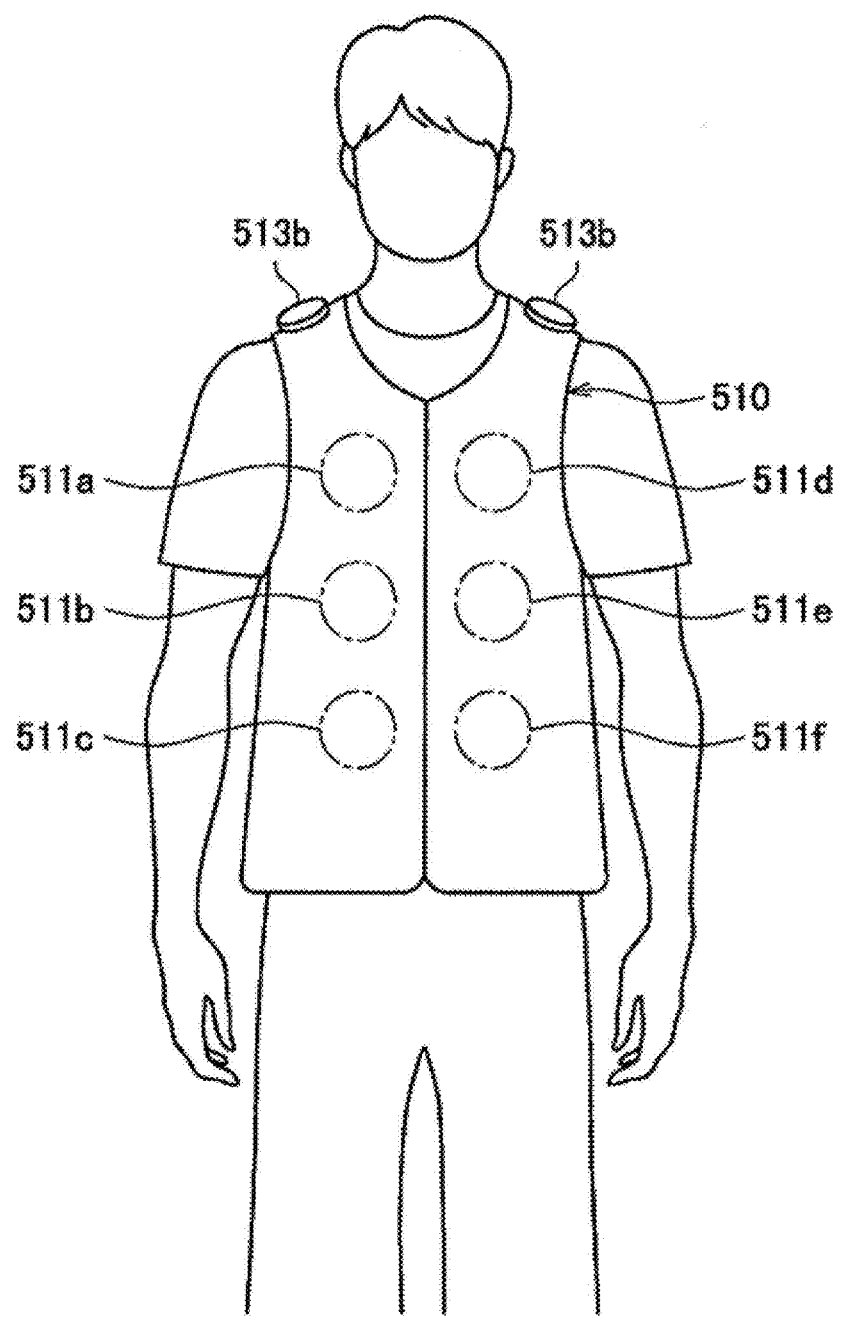

[FIG. 14]
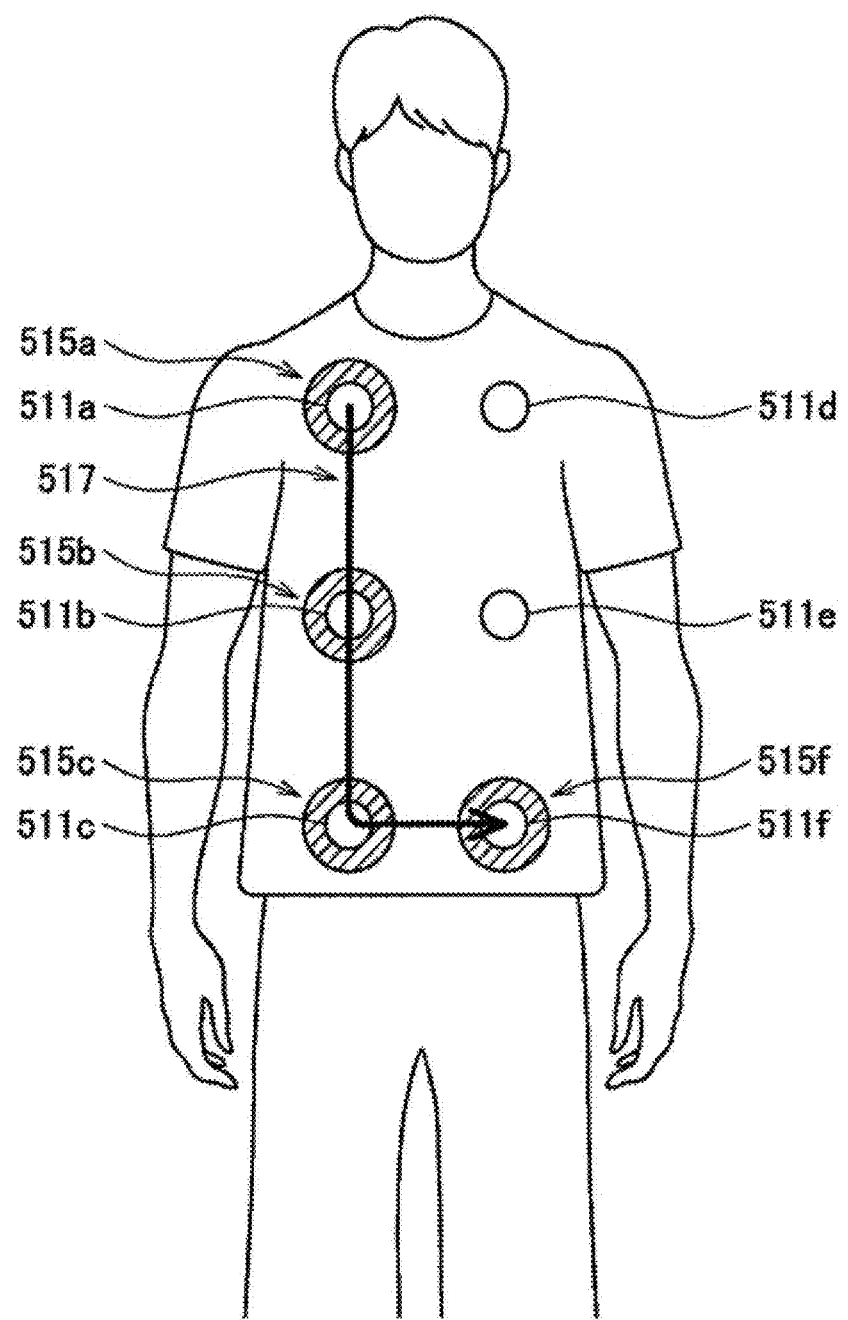

[ FIG. 15 ]
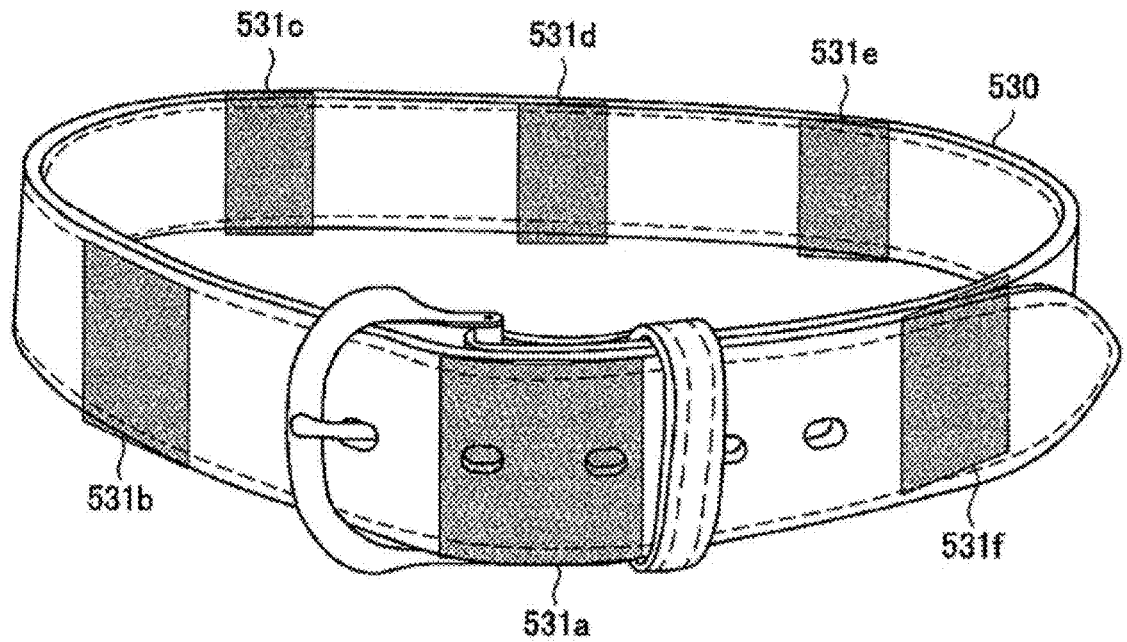
[ FIG. 16 ]
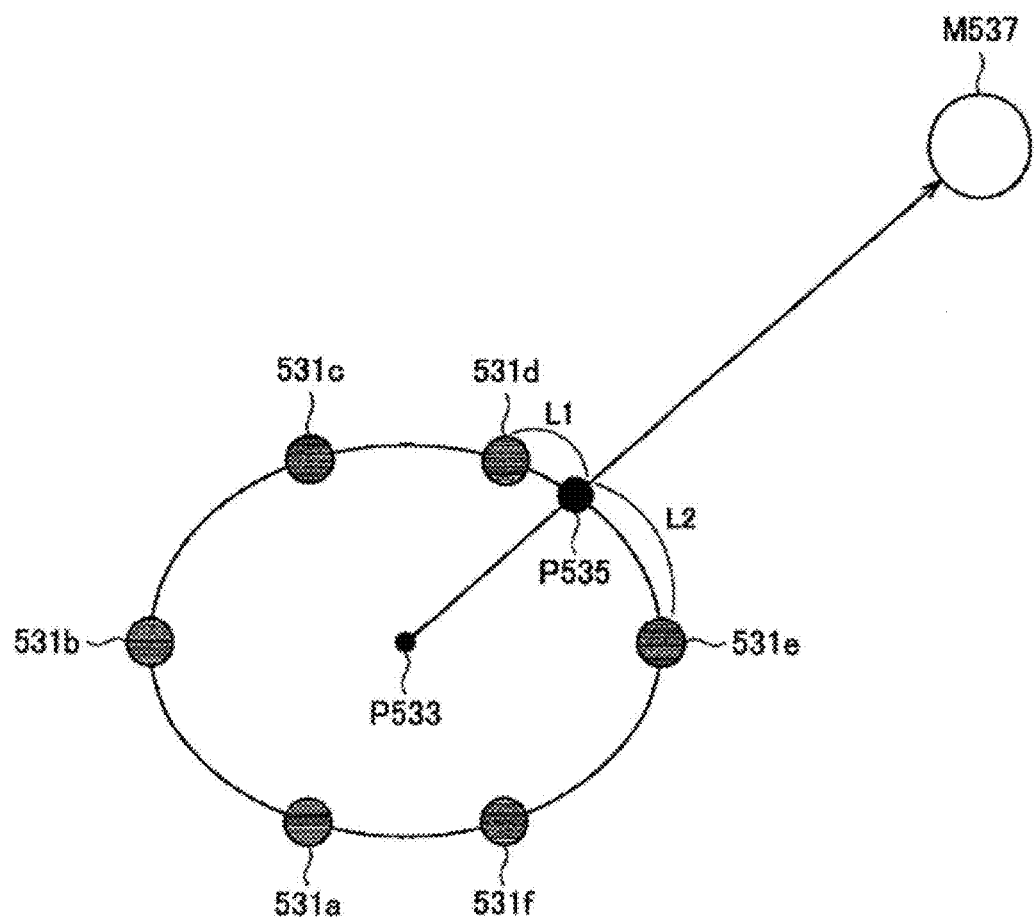

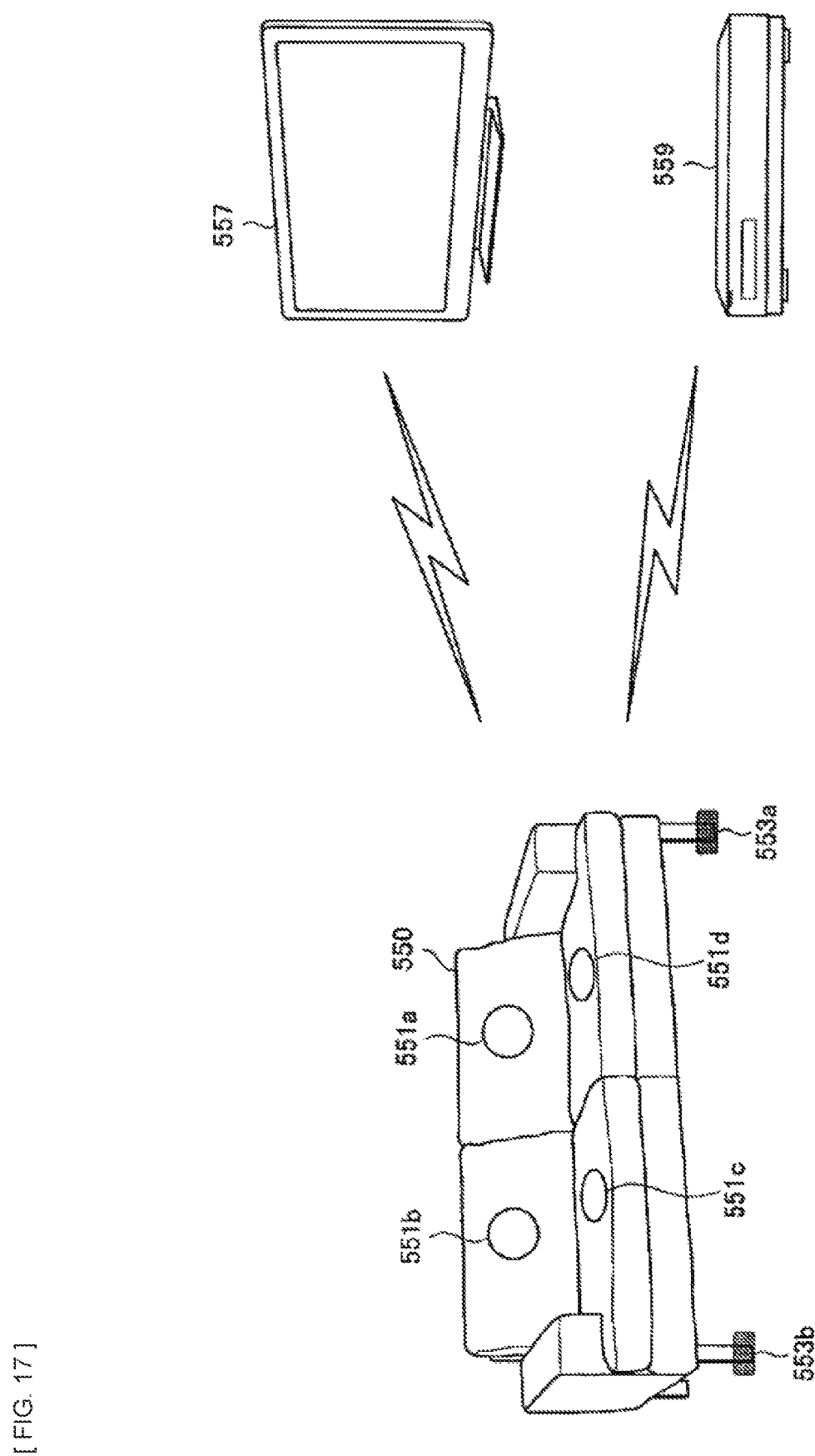

INFORMATION PROCESSING APPARATUS, INFORMATION PROCESSING SYSTEM, INFORMATION PROCESSING METHOD, AND PROGRAM

CROSS REFERENCE TO PRIOR APPLICATION

This application is a National Stage Patent Application of PCT International Patent Application No. PCT/JP2019/042096 (filed on Oct. 28, 2019) under 35 U.S.C. § 371, which claims priority to Japanese Patent Application No. 2018-233228 (filed on Dec. 13, 2018), which are all hereby incorporated by reference in their entirety.

TECHNICAL FIELD

The present disclosure relates to an information processing apparatus, an information processing system, an information processing method, and a program.

BACKGROUND ART

In recent years, as one method of providing various experiences to a user, various technologies have been proposed for presenting a haptic sensation and a force sensation (which are hereinafter also collectively and simply referred to as a "haptic sensation") by vibration or the like. For example, PTL 1 discloses one example of a technology for presenting a haptic stimulus to a user wearing a so-called wearable device including a vibration section by vibration of the vibration section. The vibration section vibrates on the basis of a control signal.

In addition, various technologies have been studied for controlling an operation of an apparatus for presenting a haptic sensation (hereinafter also referred to as a "bodily sensation introduction apparatus") from an external apparatus by transmitting control information (e.g., a control signal for driving a vibration section) to the bodily sensation introduction apparatus through communication. Application of such a technology makes it possible to implement, for example, presentation of a haptic sensation in communication between remote locations, and an effect of providing a new experience to a user is expected. In addition, use of wireless communication eliminates the necessity for using a cable and the like for communication between apparatuses, which may increase flexibility in a use method, shape, and the like of the bodily sensation introduction apparatus, and make it possible to provide a more valuable experience to a user.

CITATION LIST

Patent Literature

PTL 1: Japanese Unexamined Patent Application Publication No. 2018-60313

SUMMARY OF THE INVENTION

Problems to be Solved by the Invention

Meanwhile, under circumstances where various types of information are transmitted through communication, delivery of the information may be delayed depending on a state of the communication. Occurrence of such a delay causes a deviation of a timing of presenting a haptic stimulus to a user, which may consequently impair the value of an experience to be provided to a user with presentation of the haptic stimulus.

The present disclosure therefore proposes a technology that allows for presentation of a haptic stimulus to a user in a more suitable mode in accordance with a state of communication.

Means for Solving the Problems

According to the present disclosure, there is provided an information processing apparatus including a signal processor that extracts at least some frequency components as second control information from a plurality of frequency components included in first control information in accordance with a state of communication, in which a haptic presentation section that presents a haptic stimulus is controlled through the communication on the basis of the second control information.

In addition, according to the present disclosure, there is provided an information processing system including: a bodily sensation introduction apparatus including a haptic presentation section that presents a haptic stimulus; and an information processing apparatus including a signal processor that extracts at least some frequency components as second control information from a plurality of frequency components included in first control information in accordance with a state of communication, in which the haptic presentation section is controlled through the communication on the basis of the second control information.

In addition, according to the present disclosure, there is provided an information processing method executed by a computer, the information processing method including: extracting at least some frequency components as second control information from a plurality of frequency components included in first control information in accordance with a state of communication, in which a haptic presentation section that presents a haptic stimulus is controlled through the communication on the basis of the second control information.

In addition, according to the present disclosure, there is provided a program that causes a computer to execute: extracting at least some frequency components as second control information from a plurality of frequency components included in first control information in accordance with a state of communication, in which a haptic presentation section that presents a haptic stimulus is controlled through the communication on the basis of the second control information.

BRIEF DESCRIPTION OF DRAWINGS

FIG. 1 is an explanatory diagram that describes an example of a system configuration of an information processing system according to an embodiment of the present disclosure.

FIG. 2 is a block diagram illustrating an example of a functional configuration of the information processing system according to the same embodiment.

FIG. 3 is an explanatory diagram that describes an overview of an example of a technology relating to reduction of transmission delay in the information processing system according to the same embodiment.

FIG. 4 is an explanatory diagram that describes an overview of another example of the technology relating to reduction of transmission delay in the information processing system according to the same embodiment.

FIG. 5 is an explanatory diagram that describes an overview of another example of the technology relating to reduction of transmission delay in the information processing system according to the same embodiment.

FIG. 6 is an explanatory diagram that describes an overview of another example of the technology relating to reduction of transmission delay in the information processing system according to the same embodiment.

FIG. 7 is a flowchart illustrating an example of a flow of processes of the information processing system according to the same embodiment.

FIG. 8 is an explanatory diagram that describes an overview of an example of a technology relating to presentation of a haptic stimulus in a case where transmission delay occurs in the information processing system according to the same embodiment.

FIG. 9 is a block diagram illustrating an example of a functional configuration of a signal processor in a bodily sensation introduction apparatus according to the same embodiment.

FIG. 10 is a flowchart illustrating another example of the flow of processes of the information processing system according to the same embodiment.

FIG. 11 is an explanatory diagram that describes a modification example of the information processing system according to the same embodiment.

FIG. 12 is a functional block diagram illustrating a configuration example of a hardware configuration of the information processing apparatus according to the same embodiment.

FIG. 13 is an explanatory diagram that describes an application example 1 of the bodily sensation introduction apparatus according to the same embodiment.

FIG. 14 is an explanatory diagram that describes the application example 1 of the bodily sensation introduction apparatus according to the same embodiment.

FIG. 15 is an explanatory diagram that describes an application example 2 of the bodily sensation introduction apparatus according to the same embodiment.

FIG. 16 is an explanatory diagram that describes the application example 2 of the bodily sensation introduction apparatus according to the same embodiment.

FIG. 17 is an explanatory diagram that describes an application example 3 of the bodily sensation introduction apparatus according to the same embodiment.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference signs.

In addition, the description is given in the following order.
1. Configuration Example
1.1. System Configuration
1.2. Functional Configuration
2. Study of Control of Presentation of Haptic Stimulus through Network
3. Technical Characteristics
3.1. Technology Relating to Reduction of Transmission Delay
3.2. Technology Relating to Control of Presentation of Haptic Stimulus in Case Where Delay Occurs
4. Hardware Configuration
5. Application Examples
5.1. Application Example 1: Jacket Type Wearable Device
5.2. Application Example 2: Belt Type Wearable Device
5.3. Application Example 3: Sofa Type Device
5.4. Supplement
6. Conclusion

1. CONFIGURATION EXAMPLE

Hereinafter, description is given of an example of a configuration of an information processing system according to an embodiment of the present disclosure.

1.1. System Configuration

First, description is given of an example of a system configuration of the information processing system according to the embodiment of the present disclosure with reference to FIG. 1. FIG. 1 is an explanatory diagram that describes the example of the system configuration of the information processing system according to the present embodiment.

As illustrated in FIG. 1, an information processing system 1 according to the present embodiment includes a bodily sensation introduction apparatus 200 and an information processing apparatus 100. The bodily sensation introduction apparatus 200 includes a haptic presentation section 207, and presents a haptic stimulus to a user by driving the haptic presentation section 207. As a specific example, the bodily sensation introduction apparatus 200 is used by the user in a state in which at least a portion thereof is in contact with a predetermined part of the user, and supports the haptic presentation section 207 to be positioned in the vicinity of the portion. That is, the bodily sensation introduction apparatus 200 may include a supporting section (e.g., a housing or the like) for supporting the haptic presentation section 207 to cause the haptic presentation section 207 to be in contact with the predetermined part of the user in a state of being used by the user (e.g., a state of being worn on the predetermined part). Under such circumstances, the bodily sensation introduction apparatus 200 presents a haptic stimulus to the above-described part by driving the haptic presentation section 207. Specifically, in the information processing system 1 according to the present embodiment, the bodily sensation introduction apparatus 200 and the information processing apparatus 100 are coupled to each other through a predetermined network N1, and a haptic stimulus is presented to the user by driving the haptic presentation section 207 of the bodily sensation introduction apparatus 200 on the basis of control information transmitted from the information processing apparatus 100.

The haptic presentation section 207 may be configured, for example, to present a haptic stimulus to a target part by vibration. In this case, for example, the haptic presentation section 207 may generate vibration by driving an actuator or the like on the basis of inputted control information (e.g., a control signal). Needless to say, as long as it is possible to present a haptic stimulus to the target part, a method of presenting a haptic stimulus is not specifically limited, and the configuration of the haptic presentation section 207 may be modified as appropriate depending on the method.

The information processing apparatus 100 may be implemented by an apparatus, such as a smartphone, a PC (Personal Computer), or a server, configured to be able to communicate with another apparatus through a predetermined communication path.

It is to be noted that the type of the network N1 that couples the bodily sensation introduction apparatus 200 and the information processing apparatus 100 to each other is not specifically limited. As a specific example, the network N1 may be configured by a so-called wireless network such as a network based on Wi-Fi (registered trademark) standards. In addition, as another example, the network N1 may be configured by the Internet, a dedicated line, a LAN (Local Area Network), a WAN (Wide Area Network), or the like. In addition, the network N1 may include a plurality of networks, and at least some of the networks may be configured as a wired network.

The information processing system 1 may further include a content server 300. The content server 300 distributes, to various apparatuses through a network, data (in other words, contents) for providing various experiences by presenting an image, a sound, a haptic stimulus, and the like to the user. The information processing apparatus 100 may transmit, as the above-described control information, data relating to presentation of a haptic stimulus (e.g., a control signal for driving the haptic presentation section 207, or the like) included in contents distributed from the content server 300 to the bodily sensation introduction apparatus 200 to thereby control an operation relating to presentation of the haptic stimulus by the bodily sensation introduction apparatus 200.

The information processing system 1 may further include various types of output apparatuses such as a display apparatus 350 and an sound output apparatus 360. The display apparatus 350 includes a display and the like, and displays display information such as an image (e.g., a moving image and a still image) on a predetermined display region to thereby present various types of information to the user. In addition, the sound output apparatus 360 includes a speaker and the like, and outputs a sound such as a song and a voice to thereby present various types of information to the user. Such a configuration makes it possible to present, to the user, for example, an image, a voice and the like corresponding to the contents distributed from the content server 300 through the various types of output apparatuses described above.

It is to be noted that the configuration of the above-described information processing system 1 is merely an example, and as long as a portion corresponding to the bodily sensation introduction apparatus 200 and a portion corresponding to the information processing apparatus 100 are coupled to each other through the network N1, other configurations are not specifically limited. As a specific example, the information processing apparatus 100 and the content server 300 may be integrally configured. In addition, portions corresponding to various types of output apparatuses such as the display apparatus 350 and the sound output apparatus 360 may be implemented as devices included in the information processing apparatus 100. In addition, the portion corresponding to the information processing apparatus 100 and a portion corresponding to the content server 300 may be implemented by a plurality of apparatuses (e.g., a server and the like) operating in cooperation with each other.

The description has been given above of the example of the system configuration of the information processing system according to the embodiment of the present disclosure.

1.2. Functional Configuration

Next, description is given of an example of a functional configuration of the information processing system 1 according to the embodiment of the present disclosure with reference to FIG. 2, specifically, focused on configurations of the bodily sensation introduction apparatus 200 and the information processing apparatus 100 illustrated in FIG. 1. FIG. 2 is a block diagram illustrating an example of a functional configuration of the information processing system according to the present embodiment.

First, description is given of an example of a configuration of the information processing apparatus 100. The information processing apparatus 100 plays a role in performing various types of processing on data (control information) relating to presentation of a haptic stimulus through the bodily sensation introduction apparatus 200. As illustrated in FIG. 2, the information processing apparatus 100 includes a communication section 101, a signal processor 103, and a content processor 105. It is to be noted that although not illustrated in FIG. 2, the information processing apparatus 100 may have a configuration other than the above-described configuration in accordance with a function to be provided.

The communication section 101 includes a component for causing each component in the information processing apparatus 100 to transmit and receive various types of information to and from another apparatus (e.g., the bodily sensation introduction apparatus 200) through the network N1. The component of the communication section 101 may be changed as appropriate in accordance with a communication method and a communication path. As a specific example, in a case where the network N1 includes a wireless communication path, the communication section 101 may include various types of components for implementing wireless communication such as an RF circuit. In addition, in the following description, in a case where the components in the information processing apparatus 100 transmit and receive information to and from another apparatus (e.g., the bodily sensation introduction apparatus 200), transmission and reception of the information are performed through the communication section 101 unless otherwise specified.

The content processor 105 schematically indicates a component for executing various types of processing on various types of data (in other words, contents) for presenting an image, a sound, a haptic stimulus, and the like (in other words, providing various types of experiences) to the user. As a specific example, the content processor 105 may read, as a processing target, data of contents to be used for presentation of various types of information to the user from data of various types of contents stored in a predetermined storage region.

For example, a storage section 151 schematically indicates a storage region in which data of various types of contents is stored. It is to be noted that as long as the content processor 105 is able to read various types of data from the storage section 151, the configuration of the storage section 151 is not specifically limited. As a specific example, the storage section 151 may be built in the information processing apparatus 100. In addition, as another example, the storage section 151 may be configured as an apparatus different from the information processing apparatus 100. In this case, for example, the storage section 151 may be externally attached to the information processing apparatus 100 or may be coupled to the information processing apparatus 100 through a predetermined network.

In addition, as another example, the content processor 105 may acquire, as a processing target, data of contents to be used for presentation of various types of information to the user from another apparatus (e.g., the content server 300 illustrated in FIG. 1) through a predetermined network.

In addition, the content processor 105 according to the present embodiment extracts control information relating to presentation of a haptic stimulus from the data of the contents as the processing target, and outputs the control information to the signal processor 103. Examples of the control information include a control signal for driving the haptic presentation section 207 of the bodily sensation introduction apparatus 200. In addition, as another example, the content processor 105 may read setting relating to presentation of a haptic stimulus from the data of the contents as the processing target, generate control information relating to presentation of the haptic stimulus described above in accordance with the setting, and output the control information to the signal processor 103. It is to be noted that hereinafter, for the sake of more easily understanding characteristics of the technology according to the present embodiment, it is assumed that as the control information relating to presentation of the haptic stimulus, a control signal for driving the haptic presentation section 207 (e.g., a control signal for driving an actuator relating to presentation of vibration) is outputted to the signal processor 103. However, a mode in which the control signal to be described below is used as the above-described control information is merely an example, and as long as it is possible to substantially implement the technology according to the present disclosure, the control information is not necessarily limited to the control signal.

The signal processor 103 transmits, to the bodily sensation introduction apparatus 200 through the network N1, the control signal relating to presentation of the haptic stimulus (in other words, the above-described control information) outputted from the content processor 105. This causes the information processing apparatus 100 to control presentation of the haptic stimulus to the user by the bodily sensation introduction apparatus 200.

In addition, the signal processor 103 may perform various types of processing (e.g., signal processing) on the above-described control signal in accordance with a state of communication between the information processing apparatus 100 and the bodily sensation introduction apparatus 200 through the network N1. As a specific example, in a case where a communication rate is lowered due to congestion of the network N1 or the like, the signal processor 103 may extract some signal components (e.g., frequency components) of the control signal outputted from the content processor 105, and transmit the signal components corresponding to a result of such extraction to the bodily sensation introduction apparatus 200. This limits a data amount of the control signal to be transmitted from the information processing apparatus 100 to the bodily sensation introduction apparatus 200 through the network N1, which makes it possible to suppress delay relating to delivery of the control signal to make the delay smaller even under circumstances where the communication rate is lowered. It is to be noted that such control is described in detail later.

Next, description is given of an example of a configuration of the bodily sensation introduction apparatus 200. As illustrated in FIG. 2, the bodily sensation introduction apparatus 200 includes a communication section 201, a signal processor 203, a controller 205, and a haptic presentation section 207. It is to be noted that the haptic presentation section 207 corresponds to the haptic presentation section 207 illustrated in FIG. 1, and detailed description thereof is therefore omitted. The bodily sensation introduction apparatus 200 may further include at least one of a storage section 251 and a detector 253. In addition, although not illustrated in FIG. 2, the bodily sensation introduction apparatus 200 may have a configuration other than the above-described configuration in accordance with a function to be provided.

The communication section 201 includes a component for causing each component in the bodily sensation introduction apparatus 200 to transmit and receive various types of information to and from another apparatus (e.g., the information processing apparatus 100) through the network N1. It is to be noted that the communication section 201 are substantially similar to the above-described communication section 101, and detailed description thereof is therefore omitted.

The storage section 251 temporarily or permanently stores programs and data for implementing various functions by the bodily sensation introduction apparatus 200. As a specific example, the storage section 251 may store data for presenting a haptic stimulus (e.g., a control signal for driving the haptic presentation section 207, and the like) through the haptic presentation section 207.

The detector 253 schematically indicates a component that detects various states. The detector 253 may include, for example, a sensor in accordance with a state as a detection target (e.g., an acceleration sensor, an angular velocity sensor, a pressure sensor, and the like). As a specific example, in a case where a use case is assumed in which the user uses the bodily sensation introduction apparatus 200 while grasping a housing thereof with his hand, the detector 253 may detect a state (e.g., grasping force or the like) of grasping the bodily sensation introduction apparatus 200. In this case, the detector 253 may include, for example, a sensor that is able to detect the state of grasping, such as a pressure sensor. Detecting the state of grasping the bodily sensation introduction apparatus 200 in this manner makes it possible to control a haptic stimulus to be presented to the user through the haptic presentation section 207 in accordance with the state of grasping, for example.

The signal processor 203 transfers the control signal relating to presentation of the haptic stimulus transmitted from the information processing apparatus 100 through the network N1 to the controller 205 to be described later. At this time, the signal processor 203 may perform various types of processing (e.g., signal processing and the like) on the control signal transmitted from the information processing apparatus 100, and transfer the control signal having been subjected to the processing to the controller 205. For example, the signal processor 203 may perform various types of signal processing such as pitch adjustment and equalizing on the control signal transmitted from the information processing apparatus 100 in accordance with a result of detecting various states (e.g., the state of grasping the bodily sensation introduction apparatus 200) by the detector 253.

As a specific example, under circumstances where a haptic stimulus is presented by vibration, the stronger the force of grasping a vibrating housing is, the higher perceptual intensity of the presented haptic stimulus tends to be. Accordingly, for example, the signal processor 203 may suppress intensity of the control signal on the basis of the result of detecting the state of grasping by the detector 253 to more reduce the haptic stimulus presented through the bodily sensation introduction apparatus 200 with an increase in power of grasping the bodily sensation introduction apparatus 200 by the user. Such control makes it possible to also control the haptic stimulus to be presented with desired perceptual intensity regardless of the state of grasping. Needless to say, the above description is merely an example and does not limit the contents of the signal processing to be performed on the control signal by the signal processor 203.

In addition, the signal processor 203 may read data relating to presentation of the haptic stimulus stored in the storage section 251, and transfer a control signal corresponding to the data to the controller 205. As a specific example, in a case where congestion or the like occurs in the network N1 to cause delay in delivery of the control signal from the information processing apparatus 100, the signal processor 203 may transfer a control signal corresponding to the above-described data stored in the storage section 251 to the controller 205 as an alternative to the control signal. It is to be noted that an example of such control is also described in detail later.

The controller 205 controls operations of the respective components of the bodily sensation introduction apparatus 200. For example, the controller 205 may present a haptic stimulus to a user holding (e.g., wearing) the bodily sensation introduction apparatus 200 by driving the haptic presentation section 207 on the basis of the control signal outputted from the signal processor 203. In addition, although not illustrated in FIG. 2, the controller 205 may control an operation of any other component in accordance with a function provided by the bodily sensation introduction apparatus 200.

It is to be noted that the above description is merely an example, and the configuration of the information processing system 1 is not necessarily limited to the example illustrated in FIG. 2 as long as the information processing system 1 is configured to transfer control information (e.g., the above-described control signal or the like) for driving the haptic presentation section 207 from another apparatus to the bodily sensation introduction apparatus 200 through a network. As a specific example, communication between the information processing apparatus 100 and the bodily sensation introduction apparatus 200 may be relayed by another apparatus. In addition, some functions of the information processing apparatus 100 may be provided to an apparatus different from the information processing apparatus 100. As a specific example, the content processor 105 may be provided outside the information processing apparatus 100. In addition, the functions of the information processing apparatus 100 may be implemented by a plurality of apparatuses operating in cooperation with each other. This also applies to the bodily sensation introduction apparatus 200.

The description has been given above of the example of the functional configuration of the information processing system 1 according to the embodiment of the present disclosure with reference to FIG. 2, specifically focused on the configurations of the bodily sensation introduction apparatus 200 and the information processing apparatus 100 illustrated in FIG. 1.

2. STUDY OF CONTROL OF PRESENTATION OF HAPTIC STIMULUS THROUGH NETWORK

Next, the following description is given of an overview of a technical issue that may be expected under circumstances where a haptic stimulus is presented to a user by controlling the operation of the bodily sensation introduction apparatus 200 held by the user through the network as illustrated in FIG. 1.

Under circumstances where information (data) is transmitted through a network, delay in delivery of the information (hereinafter also referred to as "transmission delay") may occur in accordance with various conditions relating to the network. As a specific example, under circumstances where a wireless communication path is applied as the above-described network, transmission delay may occur due to influences of usage conditions of a resource of wireless communication, a state of the communication path (e.g., shielding or reflection of a radio wave by an obstacle, and the like), an interference of a wireless signal, and the like. In addition, the length of the communication path may also be a factor of transmission delay. As a specific example, transmission delay may increase in proportion to an increase in the communication path, which may make it difficult to ignore the influence of the transmission delay. Such delay that occurs in accordance with the length of the communication path may occur not only in communication through a wireless communication path, but also in communication through a wired communication accounting.

For example, in a case where a haptic stimulus is presented by driving the haptic presentation section 207 of the bodily sensation introduction apparatus 200, circumstances where presentation of the haptic stimulus lags behind an intended timing may be expected by occurrence of transmission delay as described above. As a more specific example, under circumstances where a haptic stimulus is presented in synchronization with output of an image or a voice, presentation of the haptic stimulus lags behind the output of the image or the voice, and as a result, the value of an experience to be provided to the user may be impaired by presentation of the haptic stimulus.

Conceivable approaches to further reduce the influence of transmission delay as described above include a method of compressing data to be transmitted. For example, under circumstances where an audio signal is transmitted, a data amount of the audio signal to be transmitted through a network may be compressed by subtracting information at each predetermined interval along a time direction or a frequency direction. However, it is known that if a control signal relating to presentation of a haptic stimulus is compressed by a method similar to the method of compressing the audio signal, a change in the haptic stimulus with such compression tends to be perceived by a user more easily than in a case where a voice is presented. In such a case, even if the influence of the transmission delay is reduced, circumstances where the experience to be provided to the user is impaired by presentation of the haptic stimulus may be expected.

In addition, there are physical limitations in reducing transmission delay by compression of a data amount, and depending on a network state, a case may be also expected where it is difficult to reduce the transmission delay to such an extent that apparent delay of a timing of presenting a haptic stimulus becomes negligible.

In view of the circumstances as described above, the present disclosure proposes a technology that that allows for presentation of a haptic stimulus to a user in a more suitable mode in accordance with a state of communication. Specifically, the present disclosure proposes a technology for further reducing an influence on presentation of a haptic stimulus in association with delay in transmission of information in accordance with the network state, focused on the following two aspects.

(1) Reduction of transmission delay (2) Control of presentation of a haptic stimulus in a case where transmission delay occurs

3. TECHNICAL CHARACTERISTICS

Hereinafter, description is given of technical characteristics of the information processing system according to the embodiment of the present disclosure.

3.1. Technology Relating to Reduction of Transmission Delay

First, description is given, as an example of a technology for reducing transmission delay, of an example of a technology for compressing a data amount of control information (e.g., a control signal for driving the haptic presentation section 207) relating to presentation of a haptic stimulus in a case where the control information is transmitted from the information processing apparatus 100 to the bodily sensation introduction apparatus 200 through a network.

(Basic Idea)

The information processing apparatus 100 (the signal processor 103) according to the present embodiment extracts at least some frequency components (signal components) from a control signal (control information) relating to presentation of a haptic stimulus in accordance with the state of the network N1 between the information processing apparatus 100 and the bodily sensation introduction apparatus 200, and transmits a control signal corresponding to a result of such extraction to the bodily sensation introduction apparatus 200. It is to be noted that the control signal that is a source from which signal components (frequency components) are extracted corresponds to one example of "first control information", and the control signal transmitted to the bodily sensation introduction apparatus 200 in accordance with the result of such extraction corresponds to one example of "second control information".

For example, FIG. 3 is an explanatory diagram that describes an overview of an example of a technology relating to reduction of transmission delay in the information processing system according to the embodiment of the present disclosure. The example illustrated in FIG. 3 schematically illustrates a distribution of signal intensity of a control signal relating to presentation of a haptic stimulus, where a horizontal axis indicates time t and a vertical axis indicate frequency f. As illustrated in FIG. 3, as a communication rate between the information processing apparatus 100 and the bodily sensation introduction apparatus 200 through the network N1 becomes slower, the information processing apparatus 100 further limit the data amount of the control signal to be transmitted to the bodily sensation introduction apparatus 200 by limiting frequency components extracted from the control signal to be transmitted.

Control Example 1-1: Example of Control Corresponding to Output Frequency Characteristics of Haptic Presentation Section As a specific example, the information processing apparatus 100 may determine a frequency component to be extracted from a target control signal in accordance with output frequency characteristics of the haptic presentation section 207 that presents a haptic stimulus by vibration. As a more specific example, the information processing apparatus 100 may perform control to more preferentially extract a frequency component closer to a resonant frequency of the haptic presentation section 207 (in other words, resonant frequency characteristics of an actuator). The example illustrated in an upper portion of FIG. 3 schematically indicates an example of a result of extracting a frequency component (a signal component) from the control signal to be transmitted in accordance with the resonant frequency of the haptic presentation section 207. Each of reference signs F101a to F101c schematically indicates a frequency component (i.e., a signal component to be transmitted to the bodily sensation introduction apparatus 200) extracted in accordance with the communication rate. It can be seen from comparison among frequency components F101a to F101c that the slower the communication rate is, the more the frequency component to be extracted is limited, which further limits the data amount of the control signal to be transmitted from the information processing apparatus 100 to the bodily sensation introduction apparatus 200.

Control Example 1-2: Example of Control Corresponding to Signal Intensity

In addition, as another example, the information processing apparatus 100 may determine a frequency component to be extracted from the control signal in accordance with signal intensity of each of frequency components included in the target control signal. As a more specific example, the information processing apparatus 100 may perform control to more preferentially extract a frequency component having stronger signal intensity. The example illustrated in a lower portion of FIG. 3 schematically indicates an example of a result of extracting a frequency component (a signal component) from the control signal in accordance with signal intensity of each of the frequency components included in the target control signal. Each of reference signs F103a to F103c schematically indicates a frequency component (i.e., a signal component to be transmitted to the bodily sensation introduction apparatus 200) extracted in accordance with the communication rate. It can be seen from comparison among frequency components F103a to F103c that the slower the communication rate is, the more the frequency component to be extracted is limited, which further limits the data amount of the control signal to be transmitted from the information processing apparatus 100 to the bodily sensation introduction apparatus 200.

Control Example 1-3: Example of Control in Case where Plurality of Candidates Exists A case may be assumed where there is a plurality of candidates for a frequency component having characteristic signal intensity in the target control signal. FIG. 4 is an explanatory diagram that describes an overview of another example of the technology relating to reduction of transmission delay in the information processing system according to the embodiment of the present disclosure. In the example illustrated in FIG. 4, it can be seen that there is a plurality of frequency components having stronger signal intensity. In such a case, as the example illustrated in FIG. 4, the information processing apparatus 100 may extract each of a plurality of candidates as a transmission target. In addition, as another example, the information processing apparatus 100 may extract some of the plurality of candidates as a transmission target. As a specific example, the information processing apparatus 100 may preferentially extract candidates that are closer to the resonant frequency of the haptic presentation section 207. In addition, as another example, the information processing apparatus 100 may preferentially extract a candidate having stronger signal intensity from among the plurality of candidates.

Control Example 1-4: Example of Control Corresponding to Part to which Haptic Stimulus is to be Presented In addition, in a case where a part to which a haptic stimulus is to be presented by the haptic presentation section 207 is known, the information processing apparatus 100 may control a frequency component to be extracted from the target control signal in accordance with perceptual characteristics of the part.

For example, FIG. 5 is an explanatory diagram that describes an overview of another example of the technology relating to reduction of transmission delay in the information processing system according to the embodiment of the present disclosure. Specifically, the example illustrated in FIG. 5 indicates an example in a case where a frequency component to be extracted from the target control signal is controlled in accordance with perceptual frequency characteristics of a hand. In this case, for example, a frequency component (a signal component) to be transmitted to the bodily sensation introduction apparatus 200 may be extracted by performing signal processing on data relating to presentation of a haptic stimulus (in other words, the target control signal) on the basis of data indicating the perceptual frequency characteristics of the hand.

As a specific example, a reference sign D111 indicates an example of a result of extracting a frequency component corresponding to the communication rate from the target control signal in a case where a component of a frequency (a peak frequency of perception) that allows a hand to more easily perceive a haptic stimulus is extracted more preferentially. That is, in the example with the reference sign Dill, as the communication rate becomes slower, a width of a frequency band from which a frequency component is to be extracted is limited to become narrower relative to the peak frequency of perception, thereby limiting the data amount of the control signal to be transmitted to the bodily sensation introduction apparatus 200.

In addition, as another example, a reference sign S113 indicates an example of a result of extracting a frequency component corresponding to the communication rate from data relating to presentation of a haptic stimulus (i.e., a target control signal) in accordance with a relationship between the perceptual frequency characteristics of the hand and a distribution (specifically, a distribution in the frequency direction) of signal intensity in the data. In the example with the reference sign D113, for example, each of frequency components included in the data relating to presentation of the haptic stimulus is weighted in the frequency direction on the basis of the perceptual frequency characteristics of the hand, and then a frequency component having higher signal intensity (i.e., a frequency component having higher intensity of the haptic stimulus perceived by the hand) is extracted more preferentially. In addition, in the example with the reference sign D113, for example, as the communication rate becomes slower, a threshold of signal intensity (the intensity of the haptic stimulus perceived by the hand) relating to determination of a frequency component to be extracted is controlled to become higher, thereby limiting the data amount of the control signal to be transmitted to the bodily sensation introduction apparatus 200.

Control Example 1-5: Example of Control by Combination of Plurality of Conditions In addition, the information processing apparatus 100 may control a signal component (a frequency component) to be extracted as a target to be transmitted to the bodily sensation introduction apparatus 200 from data (in other words, a target control signal) relating to presentation of a haptic stimulus by combining two or more of the above-described various conditions.

For example, FIG. 6 is an explanatory diagram that describes an overview of another example of the technology relating to reduction of transmission delay in the information processing system according to the embodiment of the present disclosure. Specifically, the example illustrated in FIG. 6 indicates an example in a case where a frequency component to be extracted from the target control signal is controlled in accordance with output frequency characteristic of the haptic presentation section 207 (e.g., an actuator) and perceptual frequency characteristics of the hand to which a haptic stimulus is to be presented. Specifically, in the example illustrated in FIG. 6, the information processing apparatus 100 weights the perceptual frequency characteristics on the basis of the output frequency characteristics of the haptic presentation section 207 to thereby calculate the perceptual frequency characteristic of the hand with the output frequency characteristics of the haptic presentation section 207 (in other words, combined frequency characteristics). Then, the information processing apparatus 100 controls a signal component (a frequency component) to be extracted from data relating to presentation of a haptic stimulus as a target to be transmitted to the bodily sensation introduction apparatus 200, in accordance with a relationship between the perceptual frequency characteristics of the hand with the output frequency characteristics of the haptic presentation section 207 and a distribution of signal intensity in the data.

As a specific example, a reference sign D121 indicates an example of a result of extracting a signal component (a frequency component) from the target control signal by a technique similar to that in the example with the reference sign D111 in FIG. 5. That is, the example with the reference sign D121 indicates an example of a result of extracting a frequency component corresponding to the communication rate from the target control signal in a case where a component of a frequency (a peak frequency of perception) that allows a hand to more easily perceive a haptic stimulus is extracted more preferentially.

In addition, as another example, a reference sign D123 indicates an example of a result of extracting a signal component (a frequency component) from the target control signal by a technique similar to that in the example with the reference sign D113 in FIG. 5. That is, the example with the reference sign D123 indicates an example of a result of extracting a frequency component corresponding to the communication rate from data relating to presentation of a haptic stimulus (i.e., a target control signal) in accordance with a relationship between the perceptual frequency characteristics of the hand with the output frequency characteristics of the haptic presentation section 207 and a distribution (specifically, a distribution in the frequency direction) of signal intensity in the data.

(Processing)

Here, description is given of an example of a flow of processes of the information processing system 1 according to the embodiment of the present disclosure with reference to FIG. 7, specifically, focused on control relating to reduction of transmission delay. FIG. 7 is a flowchart illustrating an example of a flow of processes of the information processing system according to the present embodiment.

As illustrated in FIG. 7, the information processing apparatus 100 (the content processor 105) extracts a control signal (control information) relating to presentation of a haptic stimulus from data of contents to be subjected to processing (S101). In addition, the information processing apparatus 100 (the signal processor 103) may perform signal processing on the above-described control signal in accordance with a state of communication between the information processing apparatus 100 and the bodily sensation introduction apparatus 200 through the network N1. For example, in a case where it is difficult to secure a communication rate necessary for transmission of the control signal (S103. NO), the information processing apparatus 100 may extract some frequency components from the control signal to limit frequency components to be transmitted to the bodily sensation introduction apparatus 200 (S105). Needless to say, in a case where it is possible to secure the communication rate necessary for transmission of the control signal (S103, YES), the information processing apparatus 100 may not execute the above-described processing (S105) relating to a limit of the frequency components to be transmitted. The information processing apparatus 100 then transmits the target control signal to the bodily sensation introduction apparatus 200 through the network N1.

Upon receiving the control signal from the information processing apparatus 100 through the network N1, the bodily sensation introduction apparatus 200 drives the haptic presentation section 207 on the basis of the control signal to present a haptic stimulus to a predetermined part of the user. At this time, the bodily sensation introduction apparatus 200 (the signal processor 203) may perform various types of signal processing on the control signal received from the information processing apparatus 100 on the basis of a predetermined condition (S109). As a more specific example, the bodily sensation introduction apparatus 200 may perform signal processing on the above-described control signal in accordance with a result of detecting a state of grasping the bodily sensation introduction apparatus 200 by the user. In this case, the bodily sensation introduction apparatus 200 (the controller 205) may drive the haptic presentation section 207 on the basis of the above-described control signal having been subjected to the signal processing to present a haptic stimulus to the predetermined part of the user (S111). Needless to say, the bodily sensation introduction apparatus 200 may drive the haptic presentation section 207 on the basis of the control signal received from the information processing apparatus 100 without performing signal processing on the control signal to present a haptic stimulus to the predetermined part of the user.

The description has been given above of the example of the flow of the processes of the information processing system 1 according to the embodiment of the present disclosure with reference to FIG. 7, specifically, focused on control relating to reduction of transmission delay.

(Evaluation)

As described above, the information processing apparatus 100 extracts a signal component (a frequency component) to be transmitted to the bodily sensation introduction apparatus 200 from the target control signal (i.e., data relating to presentation of a haptic stimulus) in accordance with the state of the network N1. For example, even in a case where the communication rate between the information processing apparatus 100 and the bodily sensation introduction apparatus 200 is lowered, such control makes it possible to further limit transfer delay by limiting the data amount of the control signal to be transferred through the communication. In addition, some signal components (frequency components) are extracted from the target control signal as described above to thereby extract a signal component (a frequency component) that allows the user to more easily perceive a haptic stimulus; therefore, even if the data amount is limited, it is possible to further suppress an influence on an experience to be provided to the user.

3.2. Technology Relating to Control of Presentation of Haptic Stimulus in Case where Delay Occurs Next, description is given, as an example of a technology relating to control of presentation of a haptic stimulus in a case where delay occurs, of an example of a technology that makes it possible to further suppress reduction of an experience value to be provided to a user even under circumferences where delay of a timing of presenting a haptic stimulus occurs due to transmission delay or the like.

(Basic Idea)

First, description is given of a basic idea of the technology relating to presentation of a haptic stimulus in a case where transmission delay occurs in the information processing system according to the embodiment of the present disclosure.

In a case where transmission delay occurs upon transferring data relating to presentation of a haptic stimulus (e.g., a control signal relating to driving of the haptic presentation section 207) between the information processing apparatus 100 and the bodily sensation introduction apparatus 200, the data may not be delivered to the bodily sensation introduction apparatus 200 by the timing of presenting the haptic stimulus. Under such circumstances, for example, the bodily sensation introduction apparatus 200 has difficulty in driving the haptic presentation section 207 until delivery of the data, and as a result, a timing of presenting the haptic stimulus through the haptic presentation section 207 is delayed. In addition, in a case where compressed data is transferred, it takes time to decompose the data, and as a result, not only transmission delay but also circumstances where the timing of presenting the haptic stimulus is delayed may be expected.

Accordingly, in a case where it is difficult to use data relating to presentation of a haptic stimulus transmitted from the information processing apparatus 100 at the timing of presenting the haptic stimulus, the bodily sensation introduction apparatus 200 according to the present embodiment drives the haptic presentation section 207 on the basis of alternative data (i.e., an alternative control signal) held in advance to present a haptic stimulus.

For example, FIG. 8 is an explanatory diagram that describes an overview of an example of a technology relating to presentation of a haptic stimulus in a case where transmission delay occurs in the information processing system according to the present embodiment. In FIG. 8, a horizontal axis indicates time. In addition, a reference sign F13 schematically indicates a signal waveform of a control signal (i.e., data relating to presentation of a haptic stimulus) to be transmitted from the information processing apparatus 100 to the bodily sensation introduction apparatus 200. In addition, a reference sign F15 schematically indicates a signal waveform of a control signal to be used as an alternative to the control signal F13 to drive the haptic presentation section 207. It is to be noted that in the following description, to clearly distinguish between the respective control signals (e.g., the control signals F13 and F15) described above, a control signal (the control signal F13) to be transmitted from the information processing apparatus 100 to the bodily sensation introduction apparatus 200 is also referred to as an "original signal", and a control signal (the control signal F15) to be used as an alternative to the original signal to drive the haptic presentation section 207 is also referred to as an "alternative signal". In addition, a reference sign t17 indicates a timing of starting presentation of a haptic stimulus. In addition, a reference sign t19 indicates a timing at which the original signal F13 transmitted from the information processing apparatus 100 is usable in the bodily sensation introduction apparatus 200 (i.e., a timing at which the signal waveform of the original signal F13 is made reproducible).

In the example illustrated in FIG. 8, in a period T11 from the timing t17 to the timing t19, transmission delay or the like makes it difficult for the bodily sensation introduction apparatus 200 to use the original signal F13 transmitted from the information processing apparatus 100. Accordingly, the bodily sensation introduction apparatus 200 (the signal processor 203) drives the haptic presentation section 207 on the basis of the alternative signal F15 in place of the original signal F13 to present a haptic stimulus to the user. Then, in a case where the original signal F13 becomes usable at the timing t19, the bodily sensation introduction apparatus 200 changes the control signal used for driving the haptic presentation section 207 from the alternative signal F15 to the original signal F13. At this time, the bodily sensation introduction apparatus 200 (the signal processor 203) deletes a portion corresponding to the period T11, which has already elapsed, of the signal waveform of the usable original signal F13, and uses the signal waveform at or after the timing t19 to drive the haptic presentation section 207. That is, in the example illustrated in FIG. 8, the bodily sensation introduction apparatus 200 changes the control signal to be used for driving the haptic presentation section 207 from the original signal F13 to the alternative signal F15 in the period T11 in which it is difficult to use the original signal F13. In FIG. 8, a signal waveform illustrated on an upper side schematically indicates a signal waveform before changing the control signal. In addition, a signal waveform illustrated on a lower side schematically indicates a signal waveform after the control signal is changed in the period T11. That is, in the example illustrated in FIG. 8, the timing t17 corresponds to one example of a "first timing", and the timing t19 corresponds to one example of a "second timing". In addition, the alternative signal F15 corresponds to one example of "third control information". In addition, in the following description, as with the period T11 illustrated in FIG. 8, a period in which the alternative signal is used as the control signal that drives the haptic presentation section 207 in place of the original signal (in other words, a period in which replacement with the alternative signal is performed) is also referred to as a "replacement zone".

A haptic stimulus is presented by control as described above without feeling delay. It is to be noted that as can be seen from comparison between the signal waveform on the upper side and the signal waveform on the lower side in FIG. 8 that the signal waveforms are different in the period TI 1 (the replacement zone); therefore, a haptic stimulus presented in the period T11 does not always coincide with a haptic stimulus originally assumed to be outputted. However, the user to which the haptic stimulus is presented does not necessarily recognize perception of all haptic stimuli clearly separately one by one. For example, under circumstances where haptic stimuli are continuously presented, it is rare for the user to be aware only of what initial vibration relating to presentation of a haptic stimulus should originally be. In a case where it is difficult to use the target control signal due to transmission delay or the like, as described above with reference to FIG. 8, characteristics relating to such perception of the haptic stimuli is used to present the haptic stimuli by the alternative signal until the control signal becomes usable, which makes it possible to suppress reduction of the experience value to be provided to the user.

It is to be noted that in a case where control as described above is implemented, for example, it is preferable that the information processing apparatus 100 notify the bodily sensation introduction apparatus 200 of information relating to the timing of starting presentation of a haptic stimulus (i.e., the timing t17). This makes it possible for the bodily sensation introduction apparatus 200 to recognize the timing of starting presentation of the haptic stimulus. It is to be noted that as long as it is possible for the bodily sensation introduction apparatus 200 to recognize information relating to the timing before a timing of actually starting presentation of the haptic stimulus, a method of providing notification of the information relating to the timing is not specifically limited. As a specific example, the information relating to the above-described timing may be associated with a header of data (e.g., the original signal F13) relating to presentation of the haptic stimulus. In addition, as another example, before transmission of data relating to presentation of the haptic stimulus, notification of the information relating to the above-described timing may be provided separately from the data. It is to be noted that it is possible to reduce the data amount of the information relating to the timing to an extremely small amount, as compared with the data relating to presentation of the haptic stimulus, and an influence to be exerted due to transmission delay tends to be further reduced as compared with the data (e.g., an increase in a delay time tends to be smaller).

The description has been given above of the basic idea of the technology relating to presentation of a haptic stimulus in a case where transmission delay occurs in the information processing system according to the embodiment of the present disclosure with reference to FIG. 8.

Configuration Example of Signal Processor

Next, description is given of an example of a functional configuration of the signal processor 203 of the bodily sensation introduction apparatus 200 as an example of a configuration for implementing the above-described control with reference to FIG. 8. For example, FIG. 9 is a block diagram illustrating an example of the functional configuration of the signal processor 203 in the bodily sensation introduction apparatus 200 according to the present embodiment. It is to be noted that the controller 205 and the haptic presentation section 207 illustrated in FIG. 9 correspond to the controller 205 and the haptic presentation section 207 illustrated in FIG. 2, and detailed description thereof is therefore omitted.

As illustrated in FIG. 9, the signal processor 203 includes a signal reading section 211, an alternative signal output section 213, a signal holding section 215, an output signal adjuster 217, and a signal selector 219.

The signal reading section 211 sequentially reads various types of information to be transmitted from the information processing apparatus 100 through the network N1.

Specifically, the signal reading section 211 acquires setting information relating to a timing of starting presentation of a haptic stimulus (e.g., the timing t17 illustrated in FIG. 8) from the information processing apparatus 100, and outputs the setting information to the alternative signal output section 213 and the output signal adjuster 217. This makes it possible for each of the alternative signal output section 213 and the output signal adjuster 217 to recognize the timing of starting presentation of the haptic stimulus.

In addition, the signal reading section 211 sequentially reads a control signal (data relating to presentation of the haptic stimulus) used for driving the haptic presentation section 207 that has been transmitted from the information processing apparatus 100 through the network N1, and causes the signal holding section 215 to hold the control signal. In addition, in a case where the above-described control signal is transmitted in a compressed state, the signal reading section 211 may decompress the control signal and then cause the signal holding section 215 to hold the decompressed control signal. The signal holding section 215 is a storage region that is configured to be able to temporarily or permanently store various types of data (e.g., the above-described control signal).

The alternative signal output section 213 recognizes the timing of starting presentation of the haptic stimulus on the basis of the setting information outputted from the signal reading section 211, and outputs an alternative signal (e.g., the alternative signal F15 illustrated in FIG. 8) usable for driving the haptic presentation section 207 to the signal selector 219 at the timing. It is to be noted that it is preferable that the alternative signal be stored in advance in a storage region to which the alternative signal output section 213 is able to refer, for example, as with the storage section 251.

The output signal adjuster 217 recognizes the timing of starting presentation of the haptic stimulus on the basis of the setting information outputted from the signal reading section 211, and starts measurement of an accumulated time from the timing. In addition, the output signal adjuster 217 starts monitoring the signal holding section 215, and the signal reading section 211 sequentially reads the control signal (i.e., the original signal) held by the signal holding section 215. The output signal adjuster 217 compares a result of measuring the accumulated time with a scheduled timing of presenting the haptic stimulus based on the control signal having been read from the signal holding section 215 to determine whether or not reading of a control signal corresponding to a haptic stimulus to be presented after a lapse of the accumulated time is completed. Then, in a case where the output signal adjuster 217 determines that reading of the control signal corresponding to the haptic stimulus to be presented after a lapse of the accumulated time is completed, the output signal adjuster 271 deletes a portion corresponding to the accumulated time (i.e., a portion having been already used for presentation of the haptic stimulus according to an initial schedule) of the read control signal, and then outputs the control signal to the signal selector 219.

It is to be noted that in a case where reading of the control signal from the signal holding section 215 is completed before the timing of starting presentation of the haptic stimulus, the output signal adjuster 217 may output the control signal to the signal selector 219 at the timing.

In addition, the output signal adjuster 217 may perform various types of signal processing on the control signal read from the signal holding section 215. In this case, the output signal adjuster 217 may determine that the control signal becomes usable upon completion of the signal processing.

The signal selector 219 outputs one of the control signal (i.e., the alternative signal) outputted from the alternative signal output section 213 and the control signal (i.e., the original signal) outputted from the output signal adjuster 217 to the controller 205. Specifically, the signal selector 219 outputs the alternative signal to the controller 205 under circumstances where the alternative signal is outputted only from the alternative signal output section 213. Thereafter, upon start of output of the original signal from the output signal adjuster 217, the signal selector 219 changes the control signal to be outputted to the controller 205 from the alternative signal outputted from the alternative signal output section 213 to the original signal outputted from the output signal adjuster 217. This makes it possible to implement control as illustrated in FIG. 8.

It is to be noted that in a case where output of the original signal from the output signal adjuster 217 starts before start of output of the alternative signal from the alternative signal output section 213, it is sufficient if the signal selector 219 transfers the original signal outputted from the output signal adjuster 217 to the controller 205.

The description has been given above of the example of the functional configuration of the signal processor 203 of the bodily sensation introduction apparatus 200 with reference to FIG. 9 as an example of the configuration for implementing the above-described control with reference to FIG. 8.

(Processing)

Next, description is given of an example of a flow of processes of the information processing system 1 according to the embodiment of the present disclosure with reference to FIG. 10, specifically, focused on control relating to presentation of a haptic stimulus in a case where transmission delay occurs. FIG. 10 is a flowchart illustrating another example of the flow of processes of the information processing system according to the present embodiment, and illustrates an operation of presenting a haptic stimulus by the bodily sensation introduction apparatus 200 on the basis of a control signal transmitted from the information processing apparatus 100 through a network.

As illustrated in FIG. 10, the bodily sensation introduction apparatus 200 (the signal reading section 211) acquires setting information relating to the timing of starting presentation of a haptic stimulus from the information processing apparatus 100 to thereby recognize the timing (S201). Next, the bodily sensation introduction apparatus 200 (the signal reading section 211) starts acquiring the control signal (i.e., data relating to presentation of the haptic stimulus) used for driving the haptic presentation section 207 transmitted from the information processing apparatus 100 through the network N1. In addition, the bodily sensation introduction apparatus 200 (the output signal adjuster 217) starts measuring an accumulated time from the timing of starting presentation of the haptic stimulus on the basis of the acquired setting information described above (S203).

Thereafter, in a period until control information transmitted from the information processing apparatus 100 becomes usable (S205, NO), the bodily sensation introduction apparatus 200 (the controller 205) presents the haptic stimulus to the user by driving the haptic presentation section 207 on the basis of the alternative signal.

In addition, in a case where the control signal (i.e., the original signal) transmitted from the information processing apparatus 100 becomes usable (S205, YES), the bodily sensation introduction apparatus 200 (the output signal adjuster 217) deletes a signal for the accumulated time from the original signal Thus, a signal of a portion corresponding to the period in which the haptic stimulus has been presented by the alternative signal is deleted from the original signal (S209). The bodily sensation introduction apparatus 200 (the controller 205) then changes the control signal used for driving the haptic presentation section 207 from the alternative signal to the above-described original signal (i.e., the control signal transmitted from the information processing apparatus 100) from which the signal for the accumulated time is deleted.

Even if a timing at which the control signal transmitted from the information processing apparatus 100 becomes usable lags behind the timing of starting presentation of the haptic stimulus due to transmission delay or the like, control as described above makes it possible to suppress reduction of the experience value to be provided to the user by presentation of the haptic stimulus.

The description has been given above of the example of the flow of the processes of the information processing system according to the embodiment of the present disclosure with reference to FIG. 10, specifically, focused on control relating to presentation of a haptic stimulus in a case where transmission delay occurs.

Modification Examples

Next, description is given of modification examples of the technology relating to presentation of a haptic stimulus in a case where transmission delay occurs in the information processing system 1 according to the embodiment of the present disclosure.

Example of Signal Usable as Alternative Signal

First, description is given of an example of a signal usable as an alternative signal.

As a specific example, a so-called sine wave may be used as the alternative signal. In this case, as the sine wave, for example, a sine wave corresponding to a resonant frequency of the haptic presentation section 207 may be used. In addition, as another example, a frequency of the sine wave may be specified by the information processing apparatus 100. In this case, it is sufficient if the information processing apparatus 100 notifies the bodily sensation introduction apparatus 200 of information relating to the frequency. It is to be noted that a notification method similar to that of information relating to the timing of starting presentation of a haptic stimulus is applicable to notification of the information. In addition, as another example, a waveform that applies a DC level may be used as the alternative signal.

In addition, the bodily sensation introduction apparatus 200 may hold a plurality of kinds of candidates having different signal patterns from each other for the alternative signal, and selectively change the alternative signal to be used on the basis of a predetermined condition. As a specific example, the bodily sensation introduction apparatus 200 may determine the alternative signal to be used by receiving specification of the alternative signal (e.g., specification of identification information or the like) from the information processing apparatus 100. In this case, it is preferable that information relating to the alternative signal held by the bodily sensation introduction apparatus 200 be shared between the bodily sensation introduction apparatus 200 and the information processing apparatus 100 in advance. Needless to say, the above description is merely an example, and does not limit the method of determining the alternative signal to be used by the bodily sensation introduction apparatus 200. In addition, even in a case where the alternative signal is specified by the information processing apparatus 100, the number of candidates for the alternative signal held by the bodily sensation introduction apparatus 200 itself may be one. That is, the bodily sensation introduction apparatus 200 may hold one or more candidates for the alternative signal, and determine the alternative signal to be used from among the one or more candidates in accordance with an instruction from the information processing apparatus 100.

The description has been given above of the example of the signal usable as the alternative signal. It is to be noted that the above description is merely an example, and the type of the alternative signal is not specifically limited as long as it is possible to present a haptic stimulus by driving the haptic presentation section 207. As a specific example, a signal to be used as the alternative signal may be changed as appropriate in accordance with a configuration and a method for presenting a haptic stimulus to the user by the haptic presentation section 207.

Example of Control Relating to Change of Signal

Next, the following description is given of an example of control for changing the control signal to be used for driving the haptic presentation section 207 from the alternative signal to the original signal.

For example, the bodily sensation introduction apparatus 200 may apply various types of control to suppress generation of a portion where a signal waveform is discontiguous as much as possible upon change from the alternative signal to the original signal. As a specific example, the bodily sensation introduction apparatus 200 may change from the alternative signal to the original signal by fading out the alternative signal and fading in the original signal with a timing of changing from the alternative signal to the original signal as a base point.

In addition, at or after a timing at which the original signal become usable, it is possible to control the timing of changing from the alternative signal to the original signal. For example, FIG. 11 is an explanatory diagram that describes a modification example of the information processing system according to the embodiment of the present disclosure, and illustrates an example of control for change from the alternative signal to the original signal. In FIG. 11, a horizontal axis indicate time. In addition, a reference sign F23 indicates a signal waveform of the original signal, and a reference sign F25 indicates a signal waveform of the alternative signal. In addition, a reference sign T21 indicates a replacement zone.

In the example illustrated in FIG. 11, at a timing corresponding to the end of the replacement zone T21, the original signal F23 and the alternative signal F25 are not coincident in signal intensity (amplitude) and phase with each other. Accordingly, in a case where change from the alternative signal F25 to the original signal F23 is performed at the timing, the signal waveform may become discontiguous at the timing of performing the change. Accordingly, in the example illustrated in FIG. 11, at a timing t27 at which the original signal F23 and the alternative signal F25 are substantially coincident in signal intensity and phase with each other after a lapse of the replacement zone T21, change from the alternative signal F25 to the original signal F23 is performed. This makes it possible to perform control to prevent generation of a portion where the signal waveform becomes discontiguous upon change from the alternative signal F25 to the original signal F23.

The description has been given above of the example of control for changing the control signal to be used for driving the haptic presentation section 207 from the alternative signal to the original signal. It is to be noted that the above description is merely an example, and a method of control relating to change from the alternative signal to the original signal is not specifically limited as long as it is possible to perform control to suppress generation of a portion where a signal waveform is discontiguous as much as possible upon change from the alternative signal to the original signal. In addition, as control for changing from the alternative signal to the original signal, a combination of various types of control may be applied.

(Evaluation)

As described above, in a case where it is difficult to use the control signal (i.e., the original signal) to be transmitted from the information processing apparatus 100, the bodily sensation introduction apparatus 200 uses the alternative signal to drive the haptic presentation section 207. Then, in a case where the original signal becomes usable, the bodily sensation introduction apparatus 200 changes the control signal to be used for driving the haptic presentation section 207 from the alternative signal to the original signal. Even if a timing at which the original signal becomes usable lags behind the timing of starting presentation of a haptic stimulus due to transmission delay or the like, such control makes it possible to suppress reduction of the experience value to be provided to the user by presentation of the haptic stimulus.

4. HARDWARE CONFIGURATION

Next, description is given of an example of a hardware configuration of an information processing apparatus 900 included in the information processing system 1 according to the present embodiment, such as the information processing apparatus 100 and the bodily sensation introduction apparatus 200. FIG. 12 is a block diagram illustrating a configuration example of a hardware configuration of the information processing apparatus according to the embodiment of the present disclosure.

The information processing apparatus 900 according to the present embodiment mainly includes a CPU 901, a ROM 902, and a RAM 903. The information processing apparatus 900 further includes a host bus 907, a bridge 909, an external bus 911, an interface 913, a storage apparatus 919, a drive 921, a coupling port 923, and a communication apparatus 925. The information processing apparatus 900 may further include at least one of an input apparatus 915 and an output apparatus 917.

The CPU 901 functions, for example, as an arithmetic processing apparatus and a control apparatus, and controls the overall operation or a portion thereof in the information processing apparatus 900 in accordance with various types of programs recorded in the ROM 902, the RAM 903, the storage apparatus 919, or a removable recording medium 927. The ROM 902 stores a program, an operation parameter, and the like to be used by the CPU 901. The RAM 903 temporarily stores a program to be used by the CPU 901, a parameter and the like appropriately changing in executing a program. They are coupled to each other through the host bus 907 including an internal bus such as a CPU bus. It is to be noted that in the example illustrated in FIG. 2, the signal processor 103 and the content processor 105 in the information processing apparatus 100 and the signal processor 203 and the controller 205 in the bodily sensation introduction apparatus 200 may be implemented by the CPU 901.

The host bus 907 is coupled to the external bus 911 such as a PCI (Peripheral Component Interconnect/Interface) bus through the bridge 909. In addition, the external bus 911 is coupled to the input apparatus 915, the output apparatus 917, the storage apparatus 919, the drive 921, the coupling port 923, and the communication apparatus 925 through the interface 913.

The input apparatus 915 is an operating means operated by a user, such as a mouse, a keyboard, a touch panel, a button, a switch, a lever, and a pedal. In addition, the input apparatus 915 may be, for example, a remote controlling means (a so-called remote controller) using infrared rays or other radio waves, or may be an external coupling device 929 such as a mobile phone and a PDA compatible with operations of the information processing apparatus 900. Further, the input apparatus 915 includes, for example, an input control circuit or the like that generates an input signal on the basis of information inputted by the user with use of the above-described operating means and outputs the input signal to the CPU 901. By operating this input apparatus 915, the user of the information processing apparatus 900 is able to input various types of data or give an instruction of a processing operation to the information apparatus 900.

The output apparatus 917 includes an apparatus that is able to visually or auditorily notify the user of acquired information. Such an apparatus includes a display apparatus such as a CRT display apparatus, a liquid crystal display apparatus, a plasma display apparatus, an EL display apparatus, and a lamp, an audio output apparatus such as a speaker and a headphone, a printing apparatus, and the like. The output apparatus 917 outputs, for example, a result obtained by various types of processing performed by the information processing apparatus 900. Specifically, the display apparatus displays the result obtained by various types of processing performed by the information processing apparatus 900 in text or image form. In contrast, the audio output apparatus converts an audio signal including reproduced voice data, sound data, and the like into an analog signal, and outputs the analog signal.

The storage apparatus 919 is an apparatus for storing data configured as an example of a storage section of the information processing apparatus 900. The storage apparatus 919 includes, for example, a magnetic storage device such as an HDD (Hard Disk Drive), a semiconductor storage device, an optical storage device, a magneto-optical storage device, or the like. This storage apparatus 919 stores programs to be executed by the CPU 901, various types of data, and the like. It is to be noted that in the example illustrated in FIG. 2, the storage sections 151 and 251 may be implemented, for example, by at least one of the ROM 902, the RAM 903, and the storage apparatus 919, or a combination of two or more of them.

The drive 921 is a reader/writer for a storage medium, and is built in or externally attached to the information processing apparatus 900. The drive 921 reads information recorded in the attached removable storage medium 927 such as a magnetic disk, an optical disk, a magneto-optical disk, or a semiconductor memory, and outputs the read information to the RAM 903. In addition, the drive 921 is also able to write a record into the attached removable storage medium 927 such as a magnetic disk, an optical disk, a magneto-optical disk, or a semiconductor memory. Examples of the removable recording medium 927 include a DVD medium, an HD-DVD medium, a Blu-ray (registered trademark) medium, and the like. In addition, the removable recording medium 927 may be a CompactFlash (registered trademark) (CF), a flash memory, an SD memory card (Secure Digital memory card), or the like. In addition, the removable recording medium 927 may be, for example, an IC card (Integrated Circuit card) provided with a noncontact type IC chip, an electronic device, or the like.

The coupling port 923 is a port for direct coupling to the information processing apparatus 900. Examples of the coupling port 923 include a USB (Universal Serial Bus) port, an IEEE1394 port, a SCSI (Small Computer System Interface) port, and the like. Other examples of the coupling port 923 include an RS-232C port, an optical audio terminal, an HDMI (registered trademark) (High-Definition Multimedia Interface) port, and the like. Coupling the external coupling device 929 to the coupling port 923 allows the information processing apparatus 900 to directly acquire various types of data from the external coupling device 929 and provide various types of data to the external coupling device 929.

The communication apparatus 925 is, for example, a communication interface including a communication device or the like for coupling to a communication network (network) 931. The communication apparatus 925 is, for example, a communication card or the like for wired or wireless LAN (Local Area Network), Bluetooth (registered trademark), or WUSB (Wireless USB). In addition, the communication apparatus 925 may be a router for optical communication, a router for ADSL (Asymmetric Digital Subscriber Line), a modem for various types of communication, or the like. The communication apparatus 925 is able to transmit and receive signals or the like to and from the Internet or any other communication apparatus in accordance with a predetermined protocol such as TCP/IP, for example. In addition, the communication network 931 coupled to the communication apparatus 925 includes a network coupled by wire or wirelessly, and may be, for example, the Internet, a domestic LAN, infrared communication, radio wave communication, satellite communication, or the like. It is to be noted that in the example illustrated in FIG. 2, the communication section 101 in the information processing apparatus 100 and the communication section 201 in the bodily sensation introduction apparatus 200 may be implemented by the communication apparatus 925.

The description has been given above of the example of the hardware configuration that makes it possible to implement the functions of the information processing apparatus 900 according to the embodiment of the present disclosure. Each of the above-described components may be implemented using general-purpose members, or may be implemented by hardware specialized in the functions of the respective components. Accordingly, it is possible to appropriately change hardware configurations to be utilized in accordance with a technical level at the time of implementing the present embodiment. In addition, although not illustrated in FIG. 12, the information processing apparatus 900 may include, in accordance with functions that may be implemented, various types of components for implementing the functions.

It is to be noted that it is possible to create a computer program for implementing each function of the information processing apparatus 900 according to the present embodiment as described above and to mount the computer program on a personal computer or the like. In addition, it is also possible to provide a computer-readable recording medium in which such a computer program is stored. The recording medium is, for example, a magnetic disk, an optical disk, a magneto-optical disk, a flash memory, or the like. In addition, the computer program described above may be distributed through a network, for example, without using a recording medium. In addition, the number of computers that executes the computer program is not specifically limited. For example, the computer program may be executed by a plurality of computers (e.g., a plurality of servers or the like) in cooperation with each other.

5. APPLICATION EXAMPLES

Next, description is given specifically of examples of an apparatus applicable as the bodily sensation introduction apparatus 200 in the example illustrated in FIG. 1 as application examples of the technology according to the embodiment of the present disclosure.

5.1. Application Example 1: Jacket Type Wearable Device

First, description is given, as an application example 1, of an example in a case where the bodily sensation introduction apparatus 200 according to the present embodiment is configured as a jacket type wearable device with reference to FIG. 13 and FIG. 14. FIG. 13 and FIG. 14 are explanatory diagrams that describe the application example 1 of the bodily sensation introduction apparatus 200 according to the present embodiment.

For example, FIG. 13 illustrates an appearance of a jacket 510. As illustrated in FIG. 13, the jacket 510 includes a plurality of haptic presentation sections 511 (i.e., haptic presentation sections 511a to 511f) and two sound output sections 513 (i.e., sound output sections 513a to 511f) inside the jacket 510. For example, a predetermined number (e.g., six) of haptic presentation sections 511 may be provided inside the jacket 510 on each of a front side and aback side of the user. As an example, the respective haptic presentation sections 511 are provided in a positional relationship in which the respective haptic presentation sections 511 provided on the front side are opposed to the respective haptic presentation sections 511 provided on the back side. It is to be noted that FIG. 13 illustrates an example in which the jacket 510 is sleeveless, but the jacket 510 is not limited to the example, and may have sleeves. In this case, one or more haptic presentation sections 511 may be also provided at positions corresponding to both arms of the user in addition to the chest and the abdomen of the user.

The haptic presentation sections 511 each correspond to the haptic presentation section 207 included in the bodily sensation introduction apparatus 200 in the example illustrated in FIG. 1. As a specific example, the haptic presentation sections 511 each vibrate on the basis of an inputted control signal to present a haptic stimulus. Needless to say, the configuration and the method for presenting the haptic stimulus by the haptic presentation sections 511 are not specifically limited. In addition, the technology according to the present disclosure described above is applicable to control of the haptic presentation sections 511.

In addition, in a case where the plurality of haptic presentation sections 511 included in the jacket 510 generates vibrations individually of each other, each of the generated vibrations may be perceived only on the periphery of a corresponding one of the haptic presentation sections 511. That is, in a case where the respective haptic presentation sections 511 are separately provided, vibrations separately generated by the respective haptic presentation sections 511 may be perceived discretely by the body of the user.

Meanwhile, an illusion phenomenon referred to as phantom sensation has been medically clarified. The phantom sensation is an illusion phenomenon in which, in a case where stimuli are presented simultaneously to different positions on skin, a person perceives only one stimulus between positions to which the stimuli are presented. For example, it is known that, in a case where two haptic presentation sections 511 provided on the body of the user simultaneously output stimuli, a position of a haptic stimulus perceived by the user (hereinafter, referred to as a "perceptual position") is usually a position between the two haptic presentation sections 511.

The sound output sections 513 each output a sound such as a voice, music, and an electronic sound on the basis of an inputted control signal. The sound output sections 513 may be provided one each on the left and the right of the jacket 510 as illustrated in FIG. 13. For example, the sound output sections 513 may be provided to be positioned on or near the shoulders of the user when wearing the jacket 510. Needless to say, the above description is merely an example, and only one sound output section 513 may be provided in the jacket 510, or three or more sound output sections 513 may be provided in the jacket 510. In addition, as another example, the sound output sections 513 may be provided as independent apparatuses in the predetermined space in place of being included in the jacket 510. In addition, as another example, the sound output sections 513 may be included in a wearable apparatus (e.g., headphones, a head set and the like) different from the jacket 510 or a portable apparatus (e.g., a portable music player, a smartphone, a hand-held game machine, and the like).

In addition, FIG. 14 illustrates an example of a method of controlling the jacket 510 relating to presentation of a haptic stimulus. In FIG. 14, reference signs 515a, 515b, 515c, and 515f schematically indicate peripheries of the haptic presentation sections 511a, 511b, 511c, and 511f, respectively. That is, the haptic presentation sections 511a, 511b, 511c, and 511f vibrate to present haptic stimuli to the peripheries 515a, 515b, 515c, and 515f, respectively. With such a configuration, in the example illustrated in FIG. 14, a moving path 517 of a target (e.g., an object or the like to be presented with reproduction of contents) with respect to the body of the user is set to connect respective positions in contact with the haptic presentation sections 511a, 511b, 511c, and 511f in this order. With such a configuration, sequentially driving the respective haptic presentation sections 511a, 511b, 511c, and 511f along the moving path 517 makes it possible to present a haptic stimulus perceived as if a position at which the haptic stimulus is perceived moves continuously along the moving path 517. In addition, as another example, sequentially vibrating the haptic presentation sections 511 on the front side and the haptic presentation sections 511 on the back side makes it possible to present a haptic stimulus perceived as if the haptic stimulus penetrates the body of the user.

The description has been given above, as the application example 1, of the example in a case where the bodily sensation introduction apparatus 200 according to the present embodiment is configured as the jacket type wearable device with reference to FIG. 13 and FIG. 14.

5.2. Application Example 2: Belt Type Wearable Device

Next, description is given, as an application example 2, of an example in a case where the bodily sensation introduction apparatus 200 according to the present embodiment is configured as a belt type wearable device with reference to FIG. 15 and FIG. 16. FIG. 15 and FIG. 16 are explanatory diagrams that describe the application example 2 of the bodily sensation introduction apparatus 200 according to the present embodiment.

For example, FIG. 15 is a diagram illustrating an appearance of a belt 530. As illustrated in FIG. 15, a plurality of haptic presentation sections 531 (i.e., haptic presentation sections 531a to 531f) is provided in the belt 530 along a length direction where a portion worn around the body (e.g., the waist) of the user extend. With such a configuration, the plurality of haptic presentation sections 531 is supported by wearing the belt 530 to be positioned in different directions from each other with respect to the body of the user. It is to be noted that the configuration of each of the haptic presentation sections 531 is substantially similar to those of the haptic presentation section 207 illustrated in FIG. 1 and the haptic presentation section 511 illustrated in FIG. 13, and detailed description thereof is therefore omitted. In addition, the technology according to the present disclosure described above is applicable to control of the haptic presentation sections 531.

In addition, FIG. 16 illustrates an example of a method of controlling the belt 530 relating to presentation of a haptic stimulus. FIG. 16 schematically illustrates a relative positional relationship of the plurality of haptic presentation sections 531 (i.e., the haptic presentation sections 531a to 531f) in a case where the belt 530 is worn around the body of the user. That is, the belt 550 is worn around the body of the user, which causes each of the plurality of haptic presentation sections 531 to be provided along a substantially circular path around the body as a center. For example, a reference sign P533 schematically indicates the center of a circumference formed by a path where each of the plurality of haptic presentation sections 531 is provided. That is, the body of the user wearing the belt 530 is positioned at the center P533.

With such a configuration, the haptic presentation section 531 to be vibrated of the plurality of haptic presentation sections 531 and intensity of such vibration are controlled, which makes it possible to control a position to which a haptic stimulus is to be presented through the belt 530. For example, the example illustrated in FIG. 16 indicates an example in a case where a haptic stimulus is to be presented to a haptic presentation position P535 corresponding to a direction where an object M537 is positioned with respect to the center P533.

Specifically, the haptic presentation position P535 is positioned between a position where the haptic presentation section 531d is provided and a position where the haptic presentation section 531e is provided on a substantially circular path where the haptic presentation sections 531a to 531f are provided. A reference sign L1 indicates a distance between the haptic presentation position P535 and the haptic presentation section 531d along the path. In addition, a reference sign L2 indicates a distance between the haptic presentation position P535 and the haptic presentation section 531e along the path. In this case, for example, vibration intensity Ad that causes the haptic presentation section 531d to vibrate and vibration intensity Ae that causes the haptic presentation section 531e to vibrate are controlled on the basis of the following equation, which makes it possible to perform control to perceive a haptic stimulus at the haptic presentation position P535. It is to be noted that a constant C indicates a constant determined in accordance with intensity of a haptic stimulus to be presented.

$$Ad = C \times \frac{L2}{L1 + L2}$$
$$Ae = C \times \frac{L1}{L1 + L2}$$

[Math. 1]

It is to be noted that the example of the belt type wearable device has been described above; however, it is possible to implement control described with reference to FIG. 16 by not only the belt-like wearable device but also any device worn by wrapping around a portion of the body of the user.

The description has been given above, as the application example 3, of the example in a case where the bodily sensation introduction apparatus 200 according to the present embodiment is configured as the belt type wearable device with reference to FIG. 15 and FIG. 16.

5.3. Application Example 3: Sofa Type Device

Next, description is given, as an application example 3, of an example in a case where the bodily sensation introduction apparatus 200 according to the present embodiment is configured as goods (e.g., furniture), such as a sofa, used in a state of being in contact with a portion of the body of the user with reference to FIG. 17. FIG. 17 is an explanatory diagram that describes the application example 3 of the bodily sensation introduction apparatus 200 according to the present embodiment.

Specifically, FIG. 17 illustrates an example of a schematic configuration of a sofa 550 in a case where the bodily sensation introduction apparatus 200 according to the present embodiment is configured as the sofa 550. As illustrated in FIG. 17, haptic presentation sections 551 (e.g., haptic presentation sections 551a to 551d) are provided in the sofa 550 at positions in contact with a portion of the body of the user sitting on the sofa 550. With such a configuration, driving the haptic presentation sections 551 makes it possible to present a haptic stimulus to the user sitting on the sofa 550. It is to be noted that the technology according to the present disclosure described above is applicable to control of the haptic presentation sections 551.

In addition, the sofa 550 may be provided with actuators 553 (e.g., actuators 553a and 553b) for moving the sofa 550 itself (e.g., vibrating the entire sofa 550. With such a configuration, driving the actuators 553 to vibrate the entire sofa 550 makes it possible to also present a force sensation to the user sitting on the sofa 550. It is to be noted that in the example illustrated in FIG. 17, the technology according to the present disclosure is also applicable to control of the actuators 553.

In addition, the sofa 550 may be configured to be able to transmit and receive information to and from a television set 557 that outputs an image and a voice, and a media player 559 that reproduces various types of contents to cause the television set 557 to output an image and a voice, through a predetermined network. With such a configuration, driving the haptic presentation sections 551 and the actuators 553 in synchronization with an image and a voice outputted through the television set 557 makes it possible to present a haptic stimulus and a force sensation to the user.

Needless to say, the above description is merely an example, and the technology according to the embodiment of the present disclosure is applicable to any goods and the like used in a state of being in contact with a portion of the body of the user.

The description has been given above, as the application example 3, of the example in a case where the bodily sensation introduction apparatus 200 according to the present embodiment is configured as goods such as a sofa used in a state of being in contact with a portion of the body of the user with reference to FIG. 17.

5.4. Supplement

Needless to say, the above description is merely an example, and as long as it is possible to present a haptic stimulus to the user on the basis of control information (a control signal) transferred through a network, an apparatus for presenting the haptic stimulus is not specifically limited. As a specific example, as long as a device such as a so-called controller that is used while being grasped with a hand of the user includes a component (e.g., an actuator and the like) that presents a haptic stimulus to the hand of the user, the technology according to the present disclosure is applicable to the device.

6. CONCLUSION

As described above, in the information processing system according to the embodiment of the present disclosure, the information processing apparatus includes the signal processor that extracts at least some frequency components as the second control information from a plurality of frequency components included in the first control information in accordance with a state of communication. With such configuration, the haptic presentation section that presents a haptic stimulus is controlled on the basis of the above-described second control information through the above-described communication. In addition, the above-described signal processor may control the frequency components extracted as the above-described second control information from the above-described first control information in accordance with the rate of the above-described communication.

With a configuration as described above, even in a case where, for example, a communication rate between the information processing apparatus and the haptic presentation section is lowered, limiting the data amount of control information (a control signal) to be transferred through the communication makes it possible to further limit transfer delay. In addition, extracting some frequency components (signal components) from target control information as described above makes it possible to extract a frequency component that allows the user to more easily perceive a haptic stimulus, and even if the data amount is limited, it is possible to further suppress reduction of an experience value to be provided to the user. That is, according to the technology according to the present disclosure, it is possible to present a haptic stimulus to the user in a more suitable mode in accordance with a state of communication.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure may arrive at various alterations and modifications within the scope of the technical idea described in the appended claims, and it is understood that such alterations and modifications naturally fall within the technical scope of the present disclosure.

Furthermore, the effects described herein are merely illustrative and exemplary, and not limitative. That is, the technology according to the present disclosure may exert other effects that are apparent to those skilled in the art from the description herein, in addition to the above-described effects or in place of the above-described effects.

It is to be noted that the following configurations also fall within the technical scope of the present disclosure.

(1)

An information processing apparatus including:

a signal processor that extracts at least some frequency components as second control information from a plurality of frequency components included in first control information in accordance with a state of communication, in which a haptic presentation section that presents a haptic stimulus is controlled through the communication on the basis of the second control information.

(2)

The information processing apparatus according to (1), in which the signal processor controls a frequency component to be extracted as the second control information from the first control information in accordance with a rate of the communication.

(3)

The information processing apparatus according to (2), in which the slower the rate of the communication is, the more the signal processor limits a frequency component to be extracted as the second control information from the first control information.

(4)

The information processing apparatus according to any one of (1) to (3), in which the signal processor controls a frequency component to be extracted as the second control information from the first control information in accordance with a resonant frequency of the haptic presentation section.

(5)

The information processing apparatus according to any one of (1) to (4), in which the signal processor controls a frequency component to be extracted as the second control information from the first control information in accordance with a part to which a haptic stimulus is to be presented through the haptic presentation section.

(6)

The information processing apparatus according to (5), in which the signal processor preferentially extracts, as the second control information, a frequency component that allows the part to more easily perceive a haptic stimulus.

(7)

The information processing apparatus according to any one of (1) to (6), in which the signal processor controls a frequency component to be extracted as the second control information from the first control information in accordance with signal intensity of each of the frequency components included in the first control information.

(8)

The information processing apparatus according to (7), in which the signal processor preferentially extracts a frequency component having stronger signal intensity as the second control information.

(9)

An information processing system including:

a bodily sensation introduction apparatus including a haptic presentation section that presents a haptic stimulus: and an information processing apparatus including a signal processor that extracts at least some frequency components as second control information from a plurality of frequency components included in first control information in accordance with a state of communication, in which the haptic presentation section is controlled through the communication on the basis of the second control information.

(10)

The information processing system according to (9), in which the bodily sensation introduction apparatus includes an acquiring section that acquires the second control information and setting information relating to a first timing from the information processing apparatus through the communication, the first timing relating to start of presentation of a haptic stimulus based on the second control information, and in a case where a second timing at which the second control information is usable lags behind the first timing, the haptic presentation section presents a haptic stimulus on the basis of third control information different from the second control information at least in a period between the first timing and the second timing.

(11)

The information processing system according to (10), in which the third control information is information based on a resonant frequency of the haptic presentation section.

(12)

The information processing system according to (10), in which the setting information is associated with information relating to a frequency, and information corresponding to the frequency is used as the third control information.

(13)

The information processing system according to (10), in which the setting information is associated with identification information that is associated with at least one piece of control information of one or more pieces of control information as candidates for the third control information, and information corresponding to the identification information of the one or more pieces of control information is used as the third control information.

(14)

The information processing system according to any one of (10) to (13), in which the haptic presentation section is controlled to fade out presentation of a haptic stimulus corresponding to the third control information and fade in presentation of a haptic stimulus corresponding to the second control information with the second timing as a base point.

(15)

The information processing system according to any one of (10) to (13), in which the haptic presentation section is controlled to perform change from presentation of a haptic stimulus corresponding to the third control information to presentation of a haptic stimulus corresponding to the second control information in response to a timing at which the second control information and the third control information are substantially coincident in signal intensity and phase with each other at or after the second timing.

(16)

The information processing system according to any one of (9) to (15), in which the second control information is a control signal for driving the haptic stimulus, the bodily sensation introduction apparatus includes a signal processor that performs signal processing corresponding to a use state of the bodily sensation introduction apparatus on the acquired second control information, and the haptic presentation section presents a haptic stimulus on the basis of the second control information having been subjected to the signal processing.

(17)

The information processing system according to (16), in which the bodily sensation introduction apparatus is used in a state of being grasped by a hand of a user, and the signal processor performs the signal processing on the acquired second control information in accordance with a state of the grasping.

(18)

The information processing system according to any one of (9) to (17), in which the bodily sensation introduction apparatus includes a supporting section that supports the haptic presentation section by wearing the bodily sensation introduction apparatus on a predetermined part to cause the predetermined part and the haptic presentation section to have a predetermined positional relationship.

(19)

An information processing method executed by a computer, the information processing method including:

extracting at least some frequency components as second control information from a plurality of frequency components included in first control information in accordance with a state of communication, in which a haptic presentation section that presents a haptic stimulus is controlled through the communication on the basis of the second control information.

(20)

A program that causes a computer to execute extracting at least some frequency components as second control information from a plurality of frequency components included in first control information in accordance with a state of communication, in which a haptic presentation section that presents a haptic stimulus is controlled through the communication on the basis of the second control information.

REFERENCE SIGNS LIST

1: information processing system
100: information processing apparatus
101: communication section
103: signal processor
105: content processor
151: storage section
200: bodily sensation introduction apparatus
201: communication section
203: signal processor
205: controller
207: haptic presentation section
211: section
213: alternative signal output section
215: signal holding section
217: output signal adjuster
219: signal selector
251: storage section
253: detector
300: content server
350: display apparatus
360: sound output apparatus

The invention claimed is:

1. An information processing apparatus comprising:
a signal processor configured to extract at least some frequency components as second control information from a plurality of frequency components included in first control information in accordance with a state of communication; and
a haptic presentation section configured to present a haptic stimulus,
wherein the haptic presentation section is controlled through the communication on a basis of the second control information, and
wherein the signal processor is further configured to control a frequency component to be extracted as the second control information from the first control information in accordance with a rate of the communication.

2. The information processing apparatus according to claim 1, wherein the slower the rate of the communication is, the more the signal processor limits a frequency component to be extracted as the second control information from the first control information.

3. The information processing apparatus according to claim 1, wherein the signal processor controls a frequency component to be extracted as the second control information from the first control information in accordance with a resonant frequency of the haptic presentation section.

4. The information processing apparatus according to claim 1, wherein the signal processor controls a frequency component to be extracted as the second control information from the first control information in accordance with a part to which a haptic stimulus is to be presented through the haptic presentation section.

5. The information processing apparatus according to claim 4, wherein the signal processor preferentially extracts, as the second control information, a frequency component that allows the part to more easily perceive a haptic stimulus.

6. The information processing apparatus according to claim 1, wherein the signal processor controls a frequency component to be extracted as the second control information from the first control information in accordance with signal intensity of each of the frequency components included in the first control information.

7. The information processing apparatus according to claim 6, wherein the signal processor preferentially extracts a frequency component having stronger signal intensity as the second control information.

8. An information processing system comprising:
a bodily sensation introduction apparatus including a haptic presentation section configured to present a haptic stimulus; and
an information processing apparatus including a signal processor configured to extract at least some frequency components as second control information from a plurality of frequency components included in first control information in accordance with a state of communication,
wherein the haptic presentation section is controlled through the communication on a basis of the second control information,
wherein the bodily sensation introduction apparatus further includes an acquiring section configured to acquire the second control information and setting information relating to a first timing from the information processing apparatus through the communication, the first timing relating to start of presentation of a haptic stimulus based on the second control information,
wherein in a case where a second timing at which the second control information is usable lags behind the first timing, the haptic presentation section presents the haptic stimulus on a basis of third control information different from the second control information at least in a period between the first timing and the second timing, and
wherein the acquiring section is implemented via at least one processor.

9. The information processing system according to claim 8, wherein the third control information is information based on a resonant frequency of the haptic presentation section.

10. The information processing system according to claim 8, wherein
the setting information is associated with information relating to a frequency, and information corresponding to the frequency is used as the third control information.

11. The information processing system according to claim 8, wherein
the setting information is associated with identification information that is associated with at least one piece of control information of one or more pieces of control information as candidates for the third control information, and
information corresponding to the identification information of the one or more pieces of control information is used as the third control information.

12. The information processing system according to claim 8, wherein the haptic presentation section is controlled to fade out presentation of a haptic stimulus corresponding to the third control information and fade in presentation of a haptic stimulus corresponding to the second control information with the second timing as a base point.

13. The information processing system according to claim 8, wherein the haptic presentation section is controlled to perform change from presentation of a haptic stimulus corresponding to the third control information to presentation of a haptic stimulus corresponding to the second control information in response to a timing at which the second control information and the third control information are substantially coincident in signal intensity and phase with each other at or after the second timing.

14. The information processing system according to claim 8, wherein
the second control information is a control signal for driving the haptic stimulus,
the bodily sensation introduction apparatus includes a signal processor that performs signal processing corresponding to a use state of the bodily sensation introduction apparatus on the acquired second control information, and
the haptic presentation section presents a haptic stimulus on a basis of the second control information having been subjected to the signal processing.

15. The information processing system according to claim 14, wherein
the bodily sensation introduction apparatus is used in a state of being grasped by a hand of a user, and
the signal processor performs the signal processing on the acquired second control information in accordance with a state of the grasping.

16. The information processing system according to claim 8, wherein the bodily sensation introduction apparatus includes a supporting section that supports the haptic presentation section by wearing the bodily sensation introduction apparatus on a predetermined part to cause the predetermined part and the haptic presentation section to have a predetermined positional relationship.

17. An information processing method executed by a computer, the information processing method comprising:
extracting at least some frequency components as second control information from a plurality of frequency components included in first control information in accordance with a state of communication; and
presenting a haptic stimulus,
wherein a haptic presentation section that presents the haptic stimulus is controlled through the communication on a basis of the second control information, and
wherein a frequency component to be extracted as the second control information from the first control information is controlled in accordance with a rate of the communication.

18. A non-transitory computer-readable storage medium having embodied thereon a program, which when executed by a computer causes the computer to execute a method, the method comprising:
extracting at least some frequency components as second control information from a plurality of frequency components included in first control information in accordance with a state of communication; and
presenting a haptic stimulus,
wherein a haptic presentation section that presents the haptic stimulus is controlled through the communication on a basis of the second control information, and
wherein a frequency component to be extracted as the second control information from the first control information is controlled in accordance with a rate of the communication.

* * * * *